(12) United States Patent
Zhang

(10) Patent No.: US 11,747,861 B2
(45) Date of Patent: Sep. 5, 2023

(54) BENDABLE DISPLAY MODULE AND DISPLAY DEVICE

(71) Applicant: Hubei Yangtze Industrial Innovation Center Of Advanced Display Co., Ltd., Wuhan (CN)

(72) Inventor: Qing Zhang, Wuhan (CN)

(73) Assignee: Hubei Yangtze Industrial Innovation Center Of Advanced Display Co., Ltd., Wuhan (CN)

( * ) Notice: Subject to any disclaimer, the term of this patent is extended or adjusted under 35 U.S.C. 154(b) by 0 days.

(21) Appl. No.: 17/658,828

(22) Filed: Apr. 12, 2022

(65) Prior Publication Data

US 2022/0236767 A1 Jul. 28, 2022

(30) Foreign Application Priority Data

Dec. 21, 2021 (CN) .......................... 202111574628.9

(51) Int. Cl.
*G06F 1/16* (2006.01)

(52) U.S. Cl.
CPC .......... *G06F 1/1652* (2013.01); *G06F 1/1624* (2013.01); *G06F 1/1681* (2013.01)

(58) Field of Classification Search
CPC .... G06F 1/1652; G06F 1/1624; G06F 1/1681; G09F 9/301
See application file for complete search history.

(56) References Cited

U.S. PATENT DOCUMENTS

| | | | |
|---|---|---|---|
| 9,829,923 B2* | 11/2017 | Lee .................. | G06F 1/1652 |
| 11,556,021 B2* | 1/2023 | Hirakata ........... | G06F 1/1641 |
| 11,573,606 B2* | 2/2023 | Kim .................. | H10K 59/122 |
| 11,581,380 B2* | 2/2023 | Bok .................. | H10K 59/121 |
| 11,582,876 B2* | 2/2023 | Ko .................... | G09F 9/301 |
| 2022/0187871 A1* | 6/2022 | Yamazaki ......... | H10K 59/00 |
| 2022/0192041 A1* | 6/2022 | Jeon ................. | G06F 1/1641 |
| 2022/0294886 A1* | 9/2022 | Seo .................. | H04M 1/0237 |

FOREIGN PATENT DOCUMENTS

| | | |
|---|---|---|
| CN | 106910823 A | 6/2017 |
| CN | 210444309 U | 5/2020 |
| CN | 112102729 A | 12/2020 |
| CN | 112855743 A | 5/2021 |

* cited by examiner

*Primary Examiner* — Rockshana D Chowdhury
(74) *Attorney, Agent, or Firm* — Kilpatrick Townsend & Stockton, LLP

(57) ABSTRACT

Provided are a bendable display module and a display device. The bendable display module includes a display panel component including a flexible display panel, and a first surface and a second surface that are disposed opposite to each other. The first surface is the light-emitting surface of the flexible display panel. In the unbent state, a first bendable portion and a second bendable portion are flattened. In the inwardly-bent state, the first bendable portion is bent in the direction of the first surface facing away from the second surface. In the outwardly-bent state, the second bendable portion is bent in the direction of the second surface facing away from the first surface. The area of the display region of the flexible display panel in the outwardly-bent state is larger than the area of the display region of the flexible display panel in the unbent state.

20 Claims, 15 Drawing Sheets

BENDABLE DISPLAY MODULE AND DISPLAY DEVICE

CROSS-REFERENCE TO RELATED APPLICATIONS

This application claims priority to Chinese patent application No. 202111574628.9 filed with the China National Intellectual Property Administration (CNIPA) on Dec. 21, 2021, the disclosure of which is incorporated herein by reference in its entirety.

FIELD

Embodiments of the present disclosure relate to the field of display technology and, in particular, to a bendable display module and a display device.

BACKGROUND

With the increasing development of display technology, various display products with different characteristics emerge to satisfy different requirements of use. A flexible display device is such a new-type display product with flexibility. When in use, a user can bend the flexible display device as required to reduce the size of the display device and enhance the portability of the display device. The user can also flatten the display device to obtain a relatively large display screen.

However, an existing flexible display device only supports one bent state (either the inwardly-bent state or the outwardly-bent state) and the display region of the flexible display device can only switch between two kinds of display areas (inwardly-bent and unbent, or outwardly-bent and unbent), to limit use functions and failing to meet the ever-increasing user requirements.

SUMMARY

The present disclosure provides a bendable display module and a display device to achieve various bent states and enhance user experience.

Embodiments of the present disclosure provide a bendable display module. The bendable display module includes a display panel component.

The display panel component includes a flexible display panel, and a first surface and a second surface that are disposed opposite to each other. The first surface is the light-emitting surface of the flexible display panel.

The display panel component further includes a first bendable portion and a second bendable portion.

The bendable display module includes the inwardly-bent state, the unbent state, and the outwardly-bent state.

In the unbent state, the first bendable portion and the second bendable portion are flattened.

In the inwardly-bent state, the first bendable portion is bent in the direction of the first surface facing away from the second surface.

In the outwardly-bent state, the second bendable portion is bent in the direction of the second surface facing away from the first surface.

The area of the display region of the flexible display panel in the outwardly-bent state is larger than the area of the display region of the flexible display panel in the unbent state.

Embodiments of the present disclosure further provide a display device. The display device includes a bendable display module. The bendable display module includes a display panel component. The display panel component includes a flexible display panel, a first surface, a second surface, a first bendable portion and a second bendable portion. The first surface and the second surface are disposed opposite to each other, and the first surface is a light-emitting surface of the flexible display panel. The bendable display module includes the inwardly-bent state, the unbent state, and the outwardly-bent state. In the unbent state, the first bendable portion and the second bendable portion are flattened. In the inwardly-bent state, the first bendable portion is bent in the direction of the first surface facing away from the second surface. In the outwardly-bent state, the second bendable portion is bent in the direction of the second surface facing away from the first surface. The area of the display region of the flexible display panel in the outwardly-bent state is larger than the area of the display region of the flexible display panel in the unbent state.

DETAILED DESCRIPTION

Figure 1:
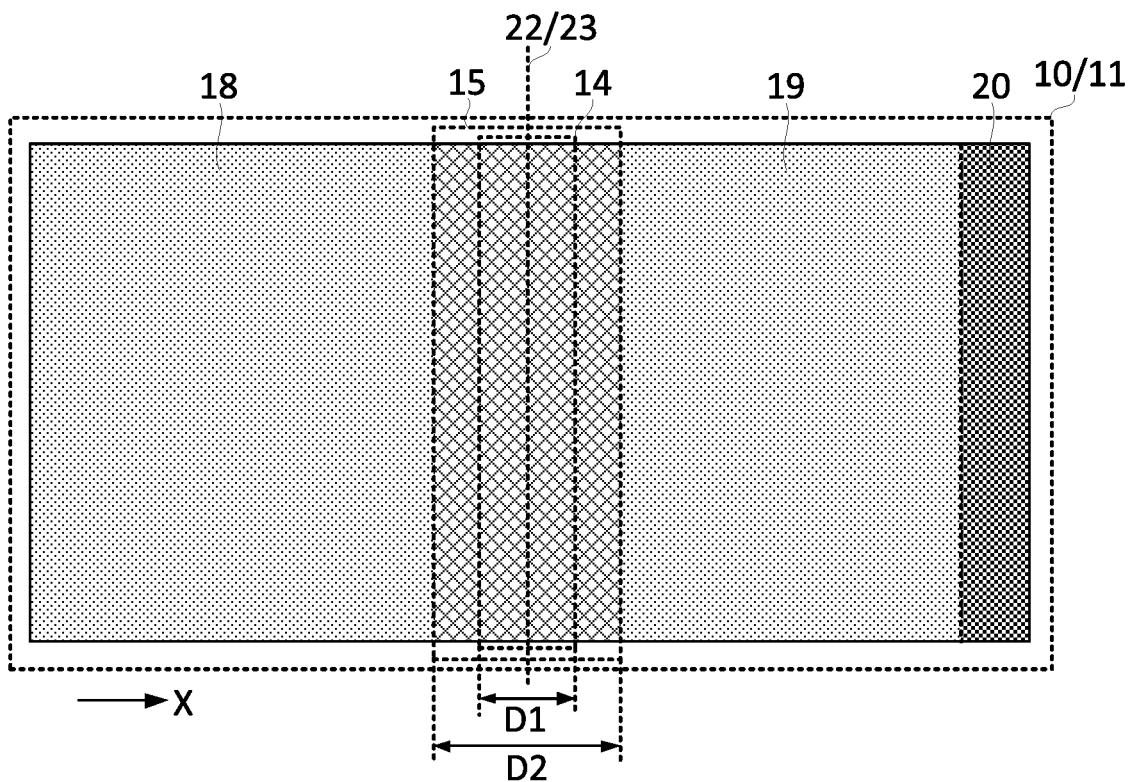
FIG. 1 is a top view illustrating the structure of a bendable display module in the unbent state according to embodiments of the present disclosure.

The present disclosure is further described hereinafter in detail in conjunction with drawings and embodiments. It is to be understood that embodiments described hereinafter are merely intended to explain the present disclosure and not to limit the present disclosure. Additionally, it is to be noted that for ease of description, only part, not all, of structures related to the present disclosure are illustrated in the drawings.

Figure 2:
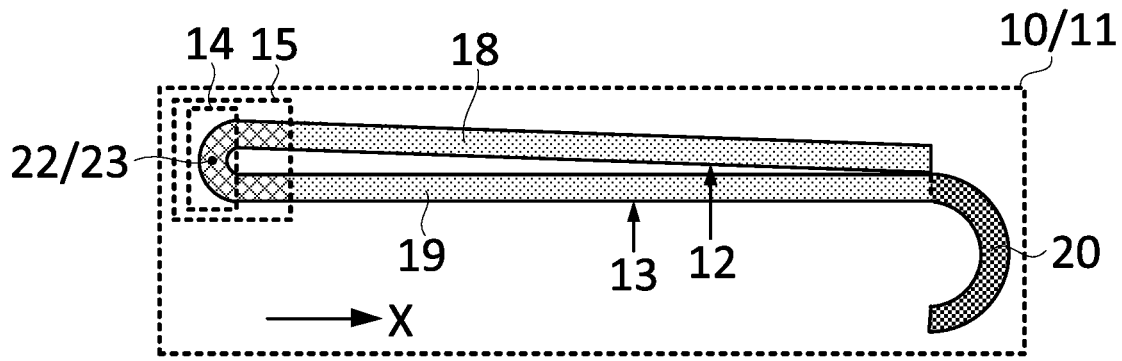
FIG. 2 is a side view illustrating the structure of a bendable display module in the inwardly-bent state according to embodiments of the present disclosure.
Figure 3:
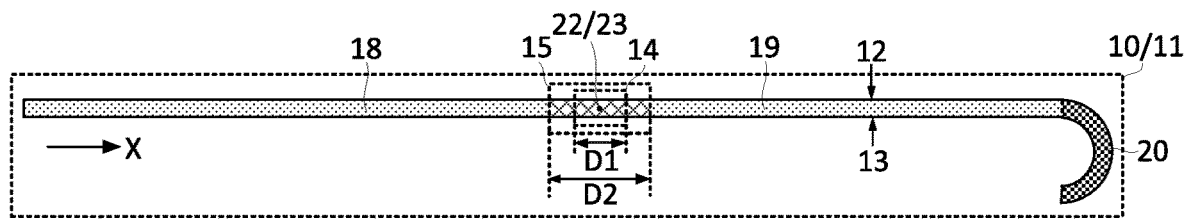
FIG. 3 is a side view illustrating the structure of a bendable display module in the unbent state according to embodiments of the present disclosure.
Figure 4:
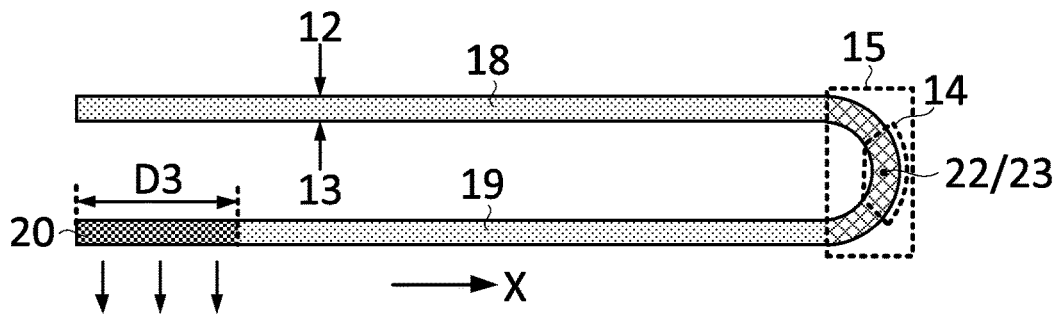
FIG. 4 is a side view illustrating the structure of a bendable display module in the outwardly-bent state according to embodiments of the present disclosure.

FIG. 1 is a top view illustrating the structure of a bendable display module in the unbent state according to embodiments of the present disclosure. FIG. 2 is a side view illustrating the structure of a bendable display module in the inwardly-bent state according to embodiments of the present disclosure. FIG. 3 is a side view illustrating the structure of a bendable display module in the unbent state according to embodiments of the present disclosure. FIG. 4 is a side view illustrating the structure of a bendable display module in the outwardly-bent state according to embodiments of the present disclosure. As shown in FIGS. 1 to 4, a bendable display module provided in embodiments of the present disclosure includes a display panel component 10. The display panel component 10 includes a flexible display panel 11. The display panel component 10 further includes a first surface 12 and a second surface 13 that are disposed opposite to each other. The first surface 12 is the light-emitting surface of the flexible display panel 11. The display panel component 10 further includes a first bendable portion 14 and a second bendable portion 15. The bendable display module includes the inwardly-bent state, the unbent state, and the outwardly-bent state. In the unbent state, the first bendable portion 14 and the second bendable portion 15 are flattened. In the inwardly-bent state, the first bendable portion 14 is bent in the direction of the first surface 12 facing away from the second surface 13. In the outwardly-bent state, the second bendable portion 15 is bent in the direction of the second surface 13 facing away from the first surface 12. The area of the display region of the flexible display panel 11 in the outwardly-bent state is larger than the area of the display region of the flexible display panel 11 in the unbent state.

The display panel component 10 may be bent and may be, for example, a flexible organic light-emitting diode (OLED) display screen, a liquid crystal display (LCD) display screen, or electronic paper. The display panel component 10 enables a bendable display device to change between the inwardly-bent state, the unbent state, and the outwardly-bent state.

As shown in FIGS. 1 to 4, the display panel component 10 includes the flexible display panel 11 to implement bending and display functions. The display panel component 10 includes the first surface 12 and the second surface 13 that are disposed opposite to each other. The first surface 12 is the light-emitting surface of the flexible display panel 11.

The bendable display module includes the inwardly-bent state, the unbent state, and the outwardly-bent state to implement a 360° bending and enhance user experience.

Exemplarily, as shown in FIG. 1 and FIG. 3, when the bendable display module is in the unbent state, the first bendable portion 14 of the display panel component 10 and the second bendable portion 15 of the display panel component 10 are flattened to obtain a relatively large display screen and meet the requirements of use for various scenarios and multiple tasks, including working and entertainment.

The arrangement in which the first bendable portion 14 and the second bendable portion 15 are flattened indicates that the light-emitting surface of the first bendable portion 14 is a plane, that the light-emitting surface of the second bendable portion 15 is a plane, and that the light-emitting surface of the first bendable portion 14 and the light-emitting surface of the second bendable portion 15 are located in the same plane. In the present application, a flattened arrangement indicates that a light-emitting surface is a plane, which is not repeated in the embodiments hereinafter.

With continued reference to FIG. 2, when the bendable display module is in the inwardly-bent state, the first bendable portion 14 is bent in the direction of the first surface 12 facing away from the second surface 13, to enhance the portability of the bendable display module. In one embodiment, in this case, the light-emitting surface of the flexible display panel 11 faces inside, protecting the flexible display panel 11 and reducing the abrasion of the flexible display panel 11 in the non-use state.

With continued reference to FIG. 4, when the bendable display module is in the outwardly-bent state, the second bendable portion 15 is bent in the direction of the second surface 13 facing away from the first surface 12, achieving a small-screen display, making it convenient for a user to operate with one hand, and facilitating use.

Figure 5:
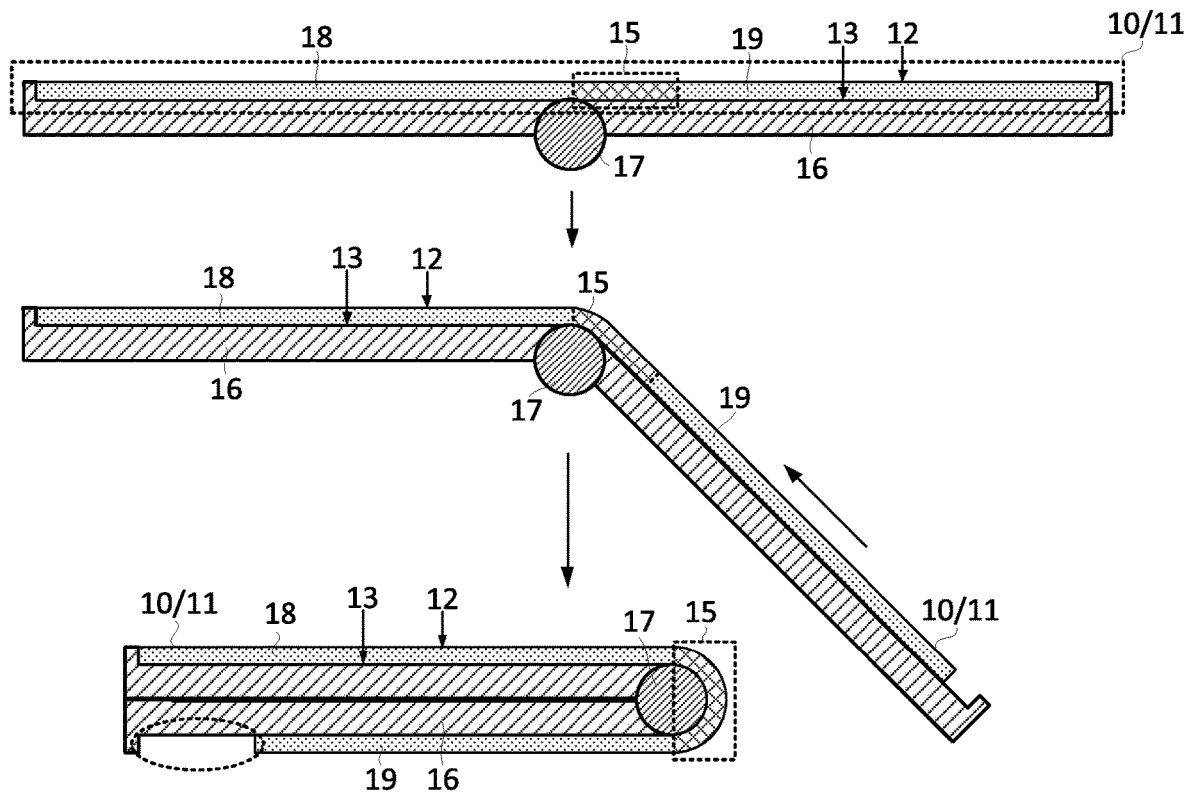
FIG. 5 is a diagram illustrating the structure of a bendable display module converted from the unbent state to the outwardly-bent state according to embodiments of the present disclosure.

FIG. 5 is a diagram illustrating the structure of a bendable display module converted from the unbent state to the outwardly-bent state according to embodiments of the present disclosure. As shown in FIG. 5, exemplarily, when the bendable display module is in the unbent state, the display region of the flexible display panel 11 faces the user (in FIG. 5, the display region faces upward) and the user may watch an image displayed in the display region of the flexible display panel 11. When the bendable display module is converted from the unbent state to the outwardly-bent state, the display region of the flexible display panel 11 faces the outside. Accordingly, even if the bendable display module is bent, the user can still watch the image displayed on the flexible display panel 11.

Further, as shown in FIG. 5, the bendable display module further includes a middle frame 16. The middle frame 16 is used for accommodating the display panel component 10. The Inventor has found through research that when the bendable display module is in the unbent state, the area of the display region of the flexible display panel 11 is equal to the area of the accommodation region provided by the middle frame 16. When the bendable display module is converted from the unbent state to the outwardly-bent state, the second bendable portion 15 is bent in the direction of the second surface 13 facing away from the first surface 12; in this case, an additional display region is needed at the bend for display. Accordingly, if the light-emitting surface of the second bendable portion 15 of the flexible display panel 11 serves as the display region at the bend, the area of the display region of the flexible display panel 11 on the middle frame 16 is smaller than the area of the accommodation region provided by the middle frame 16. In order to prevent the flexible display panel 11 from being damaged due to the straining and stretching of the flexible display panel 11, in this case, part of the accommodation region (the region indicated by the elliptical dotted box in FIG. 5) on the middle frame 16 may not be provided with the flexible display panel 11 for display. That is, a block of the display region is missing from the middle frame 16, affecting the appearance and display effect of the bendable display module.

Figure 6:
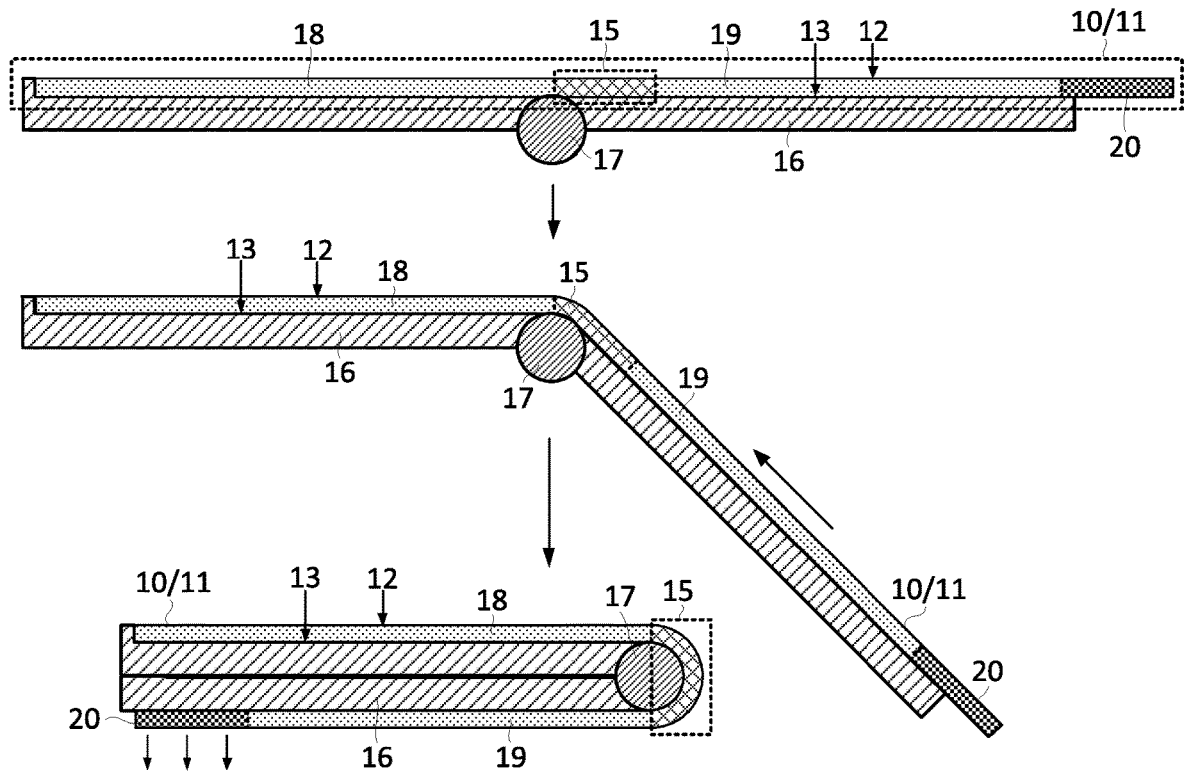
FIG. 6 is a diagram illustrating the structure of another bendable display module converted from the unbent state to the outwardly-bent state according to embodiments of the present disclosure.

FIG. 6 is a diagram illustrating the structure of another bendable display module converted from the unbent state to the outwardly-bent state according to embodiments of the present disclosure. As shown in FIG. 6, in this embodiment, the area of the display region of the flexible display panel 11 in the outwardly-bent state is arranged to be larger than the area of the display region of the flexible display panel 11 in the unbent state. With this arrangement, when the bendable display module is in the unbent state, part of the region of the flexible display panel 11 does not display and the area of the display region is equal to the area of the accommodation region provided by the middle frame 16. When the bendable display module is converted from the unbent state to the outwardly-bent state, the display region of the flexible display panel 11 enlarges; the light-emitting surface of the second bendable portion 15 serves as the display region at the bend and the increased display region of the flexible display panel 11 is used for compensating for the missing display region on the middle frame 16, to enhance the aesthetics of the bendable display module and improving the display effect of the bendable display module.

To sum up, for the bendable display module provided in embodiments of the present disclosure, in the unbent state, the first bendable portion 14 and the second bendable portion 15 are flattened; in the inwardly-bent state, the first bendable portion 14 is bent in the direction of the first surface 12 facing away from the second surface 13; and in the outwardly-bent state, the second bendable portion 15 is bent in the direction of the second surface 13 facing away from the first surface 12. This arrangement enables the bendable display module to be switched seamlessly between the inwardly-bent state, the unbent state, and the outwardly-bent state as well as enhances user experience. In one embodiment, the area of the display region of the flexible display panel 11 in the outwardly-bent state is arranged to be larger than the area of the display region of the flexible display panel 11 in the unbent state and when the bendable display module is converted from the unbent state to the outwardly-bent state, the area of the display region of the flexible display panel 11 is increased to compensate for the missing display region on the middle frame 16, to enhance the aesthetics of the bendable display module and improving the display effect of the bendable display module.

Figure 7:
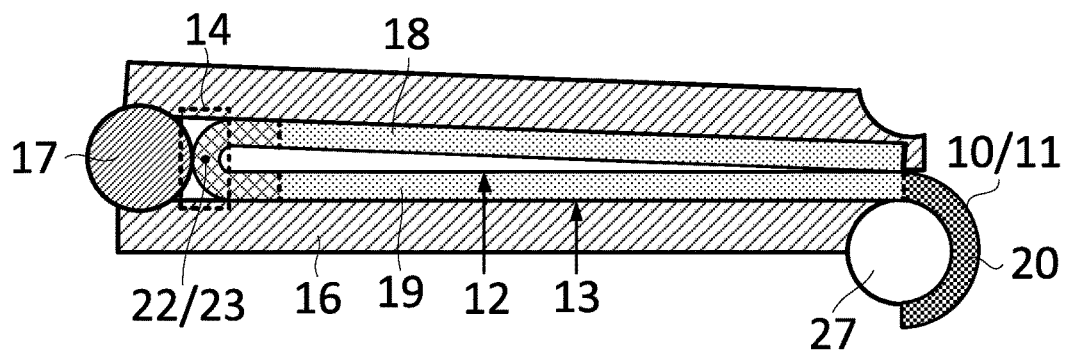
FIG. 7 is a side view illustrating the structure of another bendable display module in the inwardly-bent state according to embodiments of the present disclosure.
Figure 8:
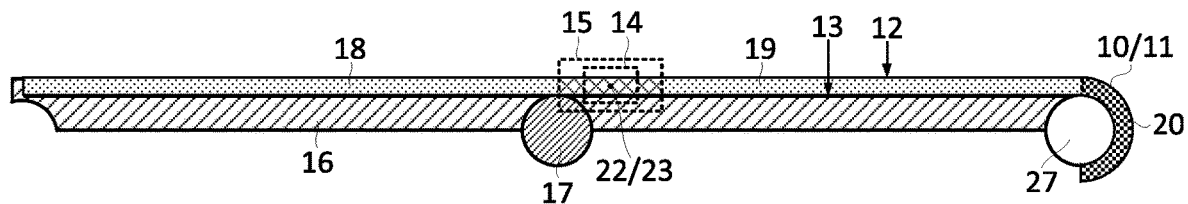
FIG. 8 is a side view illustrating the structure of another bendable display module in the unbent state according to embodiments of the present disclosure.
Figure 9:
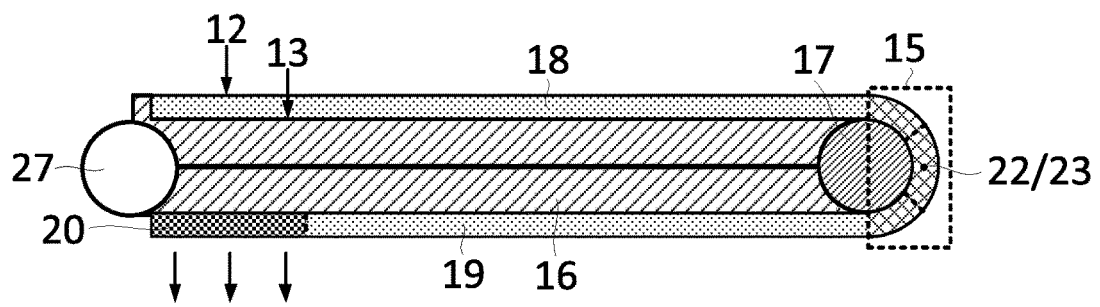
FIG. 9 is a side view illustrating the structure of another bendable display module in the outwardly-bent state according to embodiments of the present disclosure.
Figure 10:
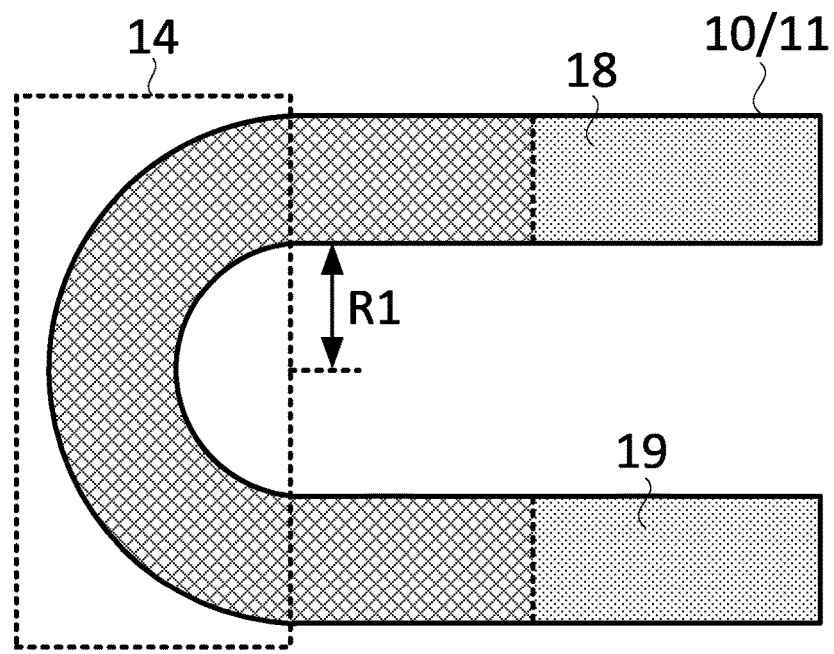
FIG. 10 is a partial enlarged view illustrating the structure of a display panel component in the inwardly-bent state according to embodiments of the present disclosure.
Figure 11:
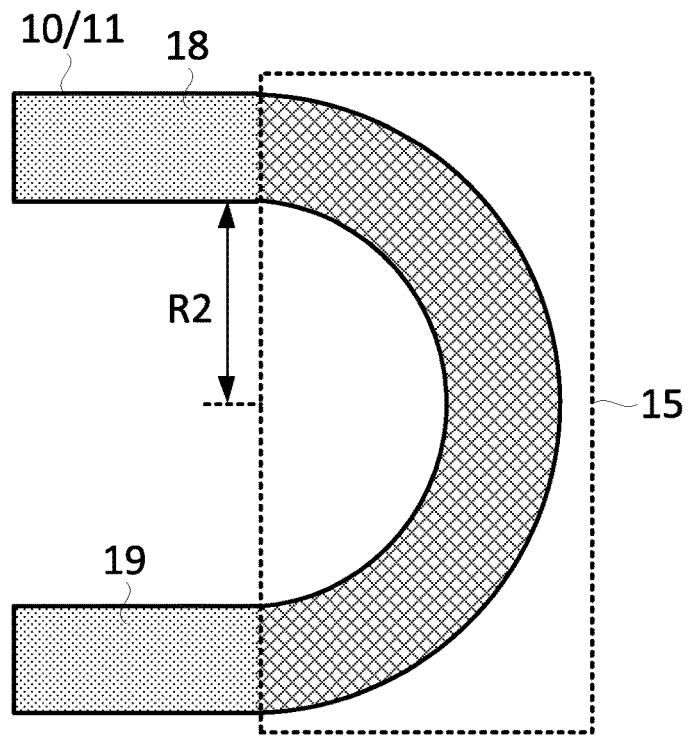
FIG. 11 is a partial enlarged view illustrating the structure of a display panel component in the outwardly-bent state according to embodiments of the present disclosure.

FIG. 7 is a side view illustrating the structure of another bendable display module in the inwardly-bent state according to embodiments of the present disclosure. FIG. 8 is a side view illustrating the structure of another bendable display module in the unbent state according to embodiments of the present disclosure. FIG. 9 is a side view illustrating the structure of another bendable display module in the outwardly-bent state according to embodiments of the present disclosure. FIG. 10 is a partial enlarged view illustrating the structure of a display panel component in the inwardly-bent state according to embodiments of the present disclosure. FIG. 11 is a partial enlarged view illustrating the structure of a display panel component in the outwardly-bent state according to embodiments of the present disclosure. As shown in FIGS. 5 to 9, the bendable display module provided in embodiments of the present disclosure may further include a bent structure 17 used for driving the first bendable portion 14 and the second bendable portion 15 to deform. The bent structure 17 is located on a side of the second surface 13 facing away from the first surface 12. As shown in FIG. 10 and FIG. 11, in the inwardly-bent state, the bend radius of the first bendable portion 14 is R1; and in the outwardly-bent state, the bend radius of the second bendable portion is R2. R1<R2.

As shown in FIGS. 5 to 9, the bent structure 17 is disposed on the side of the second surface 13 of the display panel component 10 facing away from the first surface 12 to drive the first bendable portion 14 and the second bendable portion 15 to deform under the premise of not affecting the display of the flexible display panel 11, thus enabling the bendable display module to be switched between the inwardly-bent state, the unbent state, and the outwardly-bent state.

The bent structure 17 may be a hinge or any other bent structure. Some embodiments may perform designing according to actual requirements, as long as the bendable display module can be switched between the inwardly-bent state, the unbent state, and the outwardly-bent state. This is not limited in embodiments of the present disclosure.

It is to be noted that the bent structure 17 in FIGS. 5 to 9 is exemplified as a circle. In actual situations, the specific shape of the bent structure 17 is not limited to the circle. The bent structure 17 may also be in any other shape. For example, the bent structure 17 may be a wedge-shaped hinge or a U-shaped hinge. This is not limited in embodiments of the present disclosure.

Further, since the bent structure 17 on the side of the second surface 13 facing away from the first surface 12 has a thickness, the bend radius R1 of the first bendable portion 14 in the inwardly-bent state is arranged to be smaller than the bend radius R2 of the second bendable portion is R2 in the outwardly-bent state to provide enough accommodation space for the bent structure 17 in the outwardly-bent state.

With continued reference to FIGS. 1 to 11, the display panel component 10 may further include a first non-bent portion 18 and a second non-bent portion 19. In the unbent state, the first bendable portion 14 and the second bendable portion 15 are located between the first non-bent portion 18 and the second non-bent portion 19. As shown in FIGS. 1 to 4 and FIGS. 6 to 9, the display panel component 10 further includes a first compensation bendable portion 20. The first compensation bendable portion 20 is located on a side of the second non-bent portion 19 facing away from the first bendable portion 14 and the second bendable portion 15. In the unbent state and the inwardly-bent state, the first compensation bendable portion 20 is bent in the direction of the second surface 13 facing away from the first surface 12. In the outwardly-bent state, the first compensation bendable portion 20 is flattened.

It is to be noted that the display panel component 10 shown in FIG. 5 is only provided with the first non-bent portion 18 and the second non-bent portion 19 and is not provided with the first compensation bendable portion 20. Therefore, when the bendable display module is converted from the unbent state to the outwardly-bent state, the light-emitting surface of the second bendable portion 15 serves as the display region at the bend. Part of the accommodation region (the region indicated by the elliptical dotted box in FIG. 5) on the middle frame 16 may not be provided with the flexible display panel 11 for display. That is, a block of the display region is missing from the middle frame 16, affecting the appearance and display effect of the bendable display module.

As shown in FIGS. 1 to 4 and FIGS. 7 to 9, in this embodiment, the display panel component 10 is provided with the first non-bent portion 18, the second non-bent portion 19, and the first compensation bendable portion 20.

As shown in FIG. 3 and FIG. 8, in the unbent state, the first bendable portion 14 and the second bendable portion 15 are located between the first non-bent portion 18 and the second non-bent portion 19. The first non-bent portion 18, the second non-bent portion 19, the first bendable portion 14, and the second bendable portion 15 are flattened. In this case, the light-emitting surface of the first non-bent portion 18, the light-emitting surface of the second non-bent portion 19, the light-emitting surface of the first bendable portion 14, and the light-emitting surface of the second bendable portion 15 are each a plane. In one embodiment, the light-emitting surface of the first non-bent portion 18, the light-emitting surface of the second non-bent portion 19, the light-emitting surface of the first bendable portion 14, and the light-emitting surface of the second bendable portion 15 are located in the same plane for displaying an image.

With continued reference to FIG. 3 and FIG. 8, in the unbent state, the first compensation bendable portion 20 is located on the side of the second non-bent portion 19 facing away from the first bendable portion 14 and the second bendable portion 15. The first compensation bendable portion 20 is bent in the direction of the second surface 13 facing away from the first surface 12 to reduce the space occupied by the first compensation bendable portion 20 in the horizontal direction. In this case, the first compensation bendable portion 20 does not display. The area of the display region of the flexible display panel 11 is the sum of the area of the light-emitting surface of the first non-bent portion 18, the area of the light-emitting surface of the second non-bent portion 19, the area of the light-emitting surface of the first bendable portion 14, and the area of the light-emitting surface of the second bendable portion 15 (it is to be noted that in the thickness direction of the flexible display panel 11, if the first bendable portion 14 overlaps the second bendable portion 15, the area of the light-emitting surface of the overlap needs to be subtracted).

As shown in FIG. 2 and FIG. 7, in the inwardly-bent state, the first bendable portion 14 is bent in the direction of the first surface 12 facing away from the second surface 13. In this case, the light-emitting surface of the first non-bent portion 18 and the light-emitting surface of the second non-bent portion 19 are opposite to each other, with no displaying.

With continued reference to FIG. 2 and FIG. 7, in the inwardly-bent state, the first compensation bendable portion 20 may be bent in the direction of the second surface 13 facing away from the first surface 12. In this case, the first compensation bendable portion 20 may serve as a secondary screen to display, for example, relatively simple information including date and weather and the user can obtain required information without unbending the bendable display module, to enhance user experience.

As shown in FIG. 4 and FIG. 9, in the outwardly-bent state, the second bendable portion 15 is bent in the direction of the second surface 13 facing away from the first surface 12. In this case, the light-emitting surface of the first non-bent portion 18 and the light-emitting surface of the second non-bent portion 19 face outward and display an image.

With continued reference to FIG. 4 and FIG. 9, in the outwardly-bent state, the first compensation bendable portion 20 may be flattened. In this case, the light-emitting surface of the first compensation bendable portion 20 is a plane. In one embodiment, the light-emitting surface of the first compensation bendable portion 20 and the light-emitting surface of the second non-bent portion 19 are located in the same plane. Accordingly, the first compensation bendable portion 20 serves as a part of the display region of the flexible display panel 11 for display. In this case, the area of the display region of the flexible display panel 11 is the sum of the area of the light-emitting surface of the first non-bent portion 18, the area of the light-emitting surface of the second non-bent portion 19, the area of the light-emitting surface of the first bendable portion 14, the area of the light-emitting surface of the second bendable portion 15, and the area of the light-emitting surface of the first compensation bendable portion 20 (it is to be noted that in the thickness direction of the flexible display panel 11, if the first bendable portion 14 overlaps the second bendable portion 15, the area of the light-emitting surface of the overlap needs to be subtracted). In the outwardly-bent state, the arrangement in which the first compensation bendable portion 20 is added for display compensates for the area of the display region required at the bend and fills the missing display region on the middle frame 16, to enhance the aesthetics of the bendable display module and improving the display effect of the bendable display module.

It is to be noted that in the inwardly-bent state and the unbent state, the first compensation bendable portion 20 is not limited to being bent. In other embodiments, the first compensation bendable portion 20 may also be arranged in another shape in the inwardly-bent state and the unbent state. For example, as shown in FIG. 7, the first compensation bendable portion 20 may also be arranged to be flattened in the inwardly-bent state and the unbent state. In this case, the first compensation bendable portion 20 may be shielded by a structure such as a housing and the first compensation bendable portion 20 is hidden and does not display. This is not limited in embodiments of the present disclosure.

Figure 12:
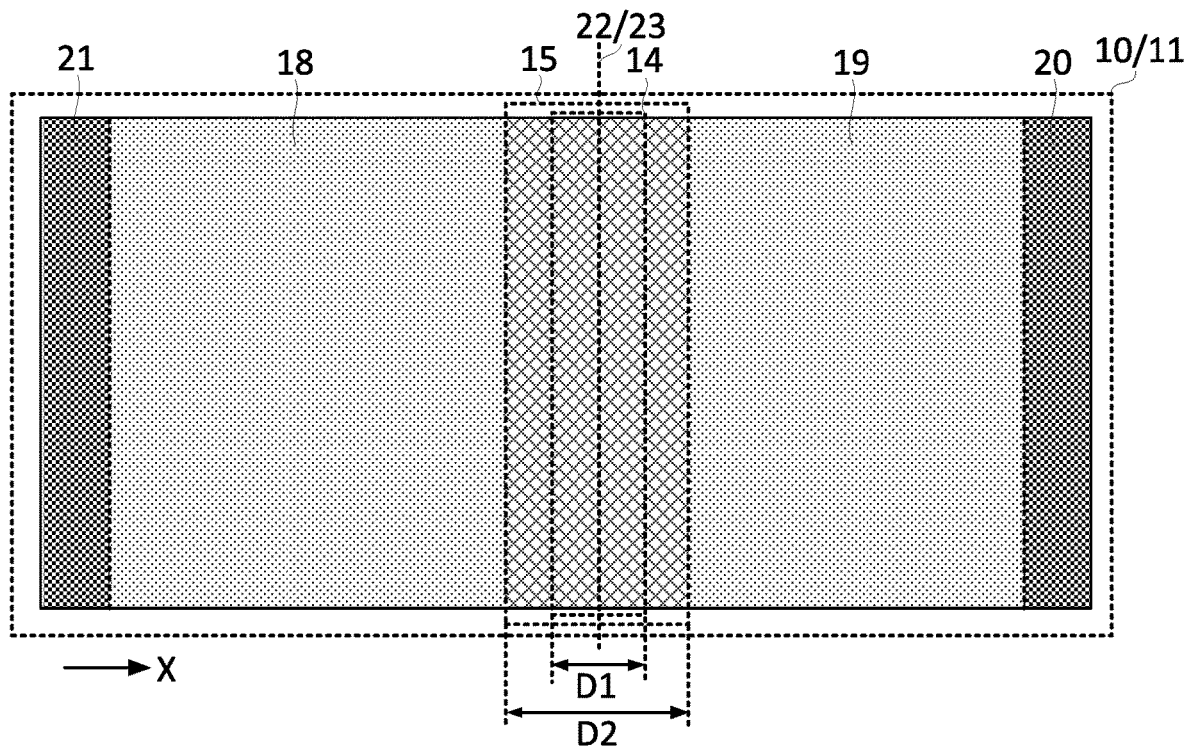
FIG. 12 is a top view illustrating the structure of another bendable display module in the unbent state according to embodiments of the present disclosure.
Figure 13:
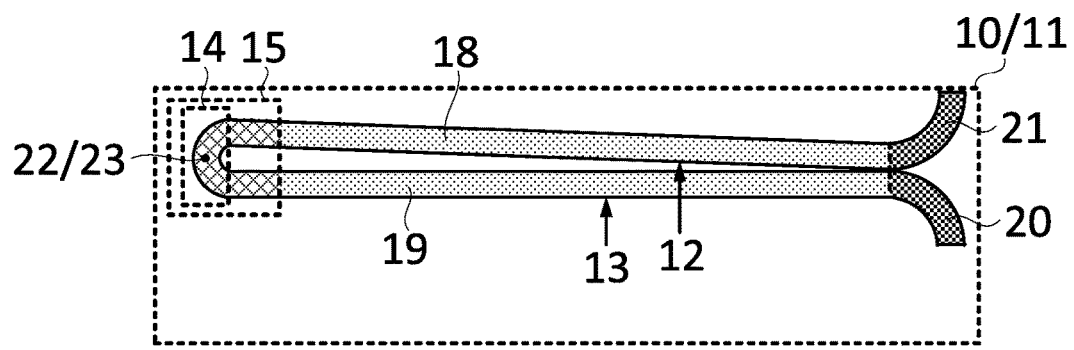
FIG. 13 is a side view illustrating the structure of another bendable display module in the inwardly-bent state according to embodiments of the present disclosure.
Figure 14:
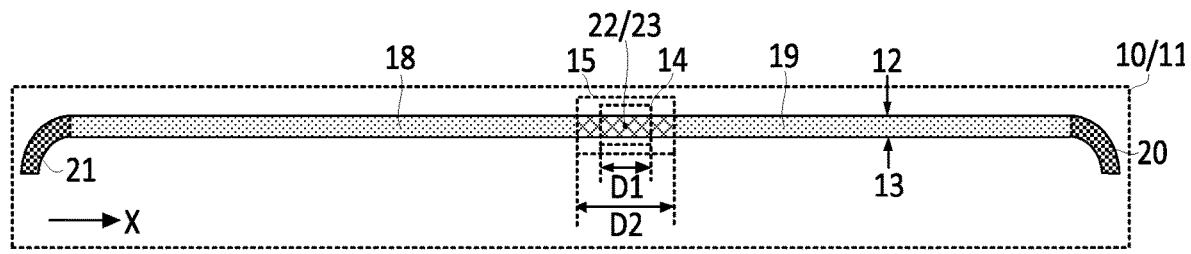
FIG. 14 is a side view illustrating the structure of another bendable display module in the unbent state according to embodiments of the present disclosure.
Figure 15:
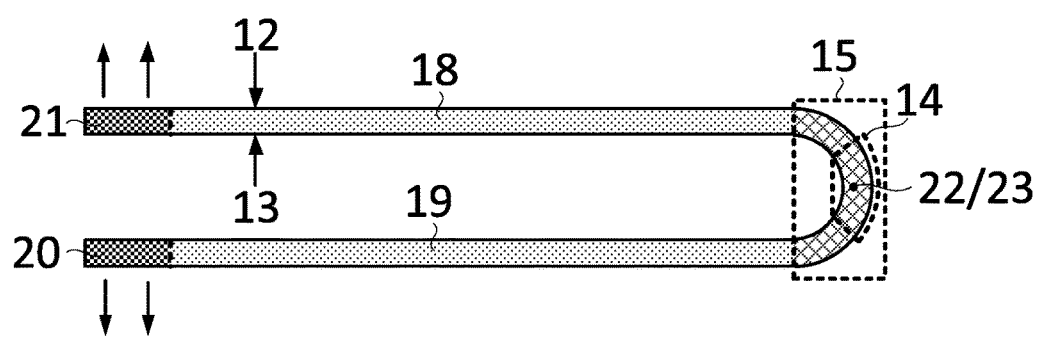
FIG. 15 is a side view illustrating the structure of another bendable display module in the outwardly-bent state according to embodiments of the present disclosure.

FIG. 12 is a top view illustrating the structure of another bendable display module in the unbent state according to embodiments of the present disclosure. FIG. 13 is a side view illustrating the structure of another bendable display module in the inwardly-bent state according to embodiments of the present disclosure. FIG. 14 is a side view illustrating the structure of another bendable display module in the unbent state according to embodiments of the present disclosure. FIG. 15 is a side view illustrating the structure of another bendable display module in the outwardly-bent state according to embodiments of the present disclosure. As shown in FIGS. 12 to 15, the display panel component 10 may further include a second compensation bendable portion 21. The second compensation bendable portion 21 is located on a side of the first non-bent portion 18 facing away from the first bendable portion 14 and the second bendable portion 15. In the unbent state and the inwardly-bent state, the second compensation bendable portion 21 is bent in the direction of the second surface 13 facing away from the first surface 12. In the outwardly-bent state, the second compensation bendable portion 21 is flattened.

As shown in FIG. 12 and FIG. 14, in the unbent state, the second compensation bendable portion 21 is located on a side of the first non-bent portion 18 facing away from the first bendable portion 14 and the second bendable portion 15. The first compensation bendable portion 20 and the second compensation bendable portion 21 are bent in the direction of the second surface 13 facing away from the first surface 12 to reduce the space occupied by the first compensation bendable portion 20 in the horizontal direction. In this case, the first compensation bendable portion 20 and the second compensation bendable portion 21 do not display. The area of the display region of the flexible display panel 11 is the sum of the area of the light-emitting surface of the first non-bent portion 18, the area of the light-emitting surface of the second non-bent portion 19, the area of the light-emitting surface of the first bendable portion 14, and the area of the light-emitting surface of the second bendable portion 15 (it is to be noted that in the thickness direction of the flexible display panel 11, if the first bendable portion 14 overlaps the second bendable portion 15, the area of the light-emitting surface of the overlap needs to be subtracted).

As shown in FIG. 13, in the inwardly-bent state, the first compensation bendable portion 20 and the second compensation bendable portion 21 are bent in the direction of the second surface 13 facing away from the first surface 12. In this case, the first compensation bendable portion 20 and the second compensation bendable portion 21 may both serve as the secondary screen for display, for example, relatively simple information including date and weather and the user can obtain required information without unbending the bendable display module, to enhance user experience.

As shown in FIG. 15, in the outwardly-bent state, the first compensation bendable portion 20 and the second compensation bendable portion 21 are flattened. In this case, the light-emitting surface of the first compensation bendable portion 20 and the light-emitting surface of the second compensation bendable portion 21 are each a plane. In one embodiment, the light-emitting surface of the first compensation bendable portion 20 and the light-emitting surface of the second non-bent portion 19 are located in the same plane, and the light-emitting surface of the second compensation bendable portion 21 and the light-emitting surface of the first non-bent portion 18 are located in the same plane. Accordingly, the first compensation bendable portion 20 and the second compensation bendable portion 21 may serve as a part of the display region of the flexible display panel 11 for display. In this case, the area of the display region of the flexible display panel 11 is the sum of the area of the light-emitting surface of the first non-bent portion 18, the area of the light-emitting surface of the second non-bent portion 19, the area of the light-emitting surface of the first bendable portion 14, the area of the light-emitting surface of the second bendable portion 15, the area of the light-emitting surface of the first compensation bendable portion 20, and the area of the light-emitting surface of the second compensation bendable portion 21 (it is to be noted that in the thickness direction of the flexible display panel 11, if the first bendable portion 14 overlaps the second bendable portion 15, the area of the light-emitting surface of the overlap needs to be subtracted). In the outwardly-bent state, the arrangement in which the first compensation bendable portion 20 and the second compensation bendable portion 21 are added to two opposite sides of the flexible display panel 11 for display compensates for the area of the display region required at the bend and fills the missing display region on the middle frame 16, to enhance the aesthetics of the bendable display module and improving the display effect of the bendable display module.

It is to be noted that in the inwardly-bent state and the unbent state, the second compensation bendable portion 21 is not limited to being bent. In other embodiments, the second compensation bendable portion 21 may also be arranged in another shape in the inwardly-bent state and the unbent state. For example, the second compensation bendable portion 21 may also be arranged to be flattened in the inwardly-bent state and the unbent state. In this case, the second compensation bendable portion 21 may be shielded by a structure such as a housing and the second compensation bendable portion 21 is hidden and does not perform display. This is not limited in embodiments of the present disclosure.

With continued reference to FIGS. 1, 3, 8, 12 and 14, in the thickness direction of the display panel component 10, the first bendable portion 14 and the second bendable portion 15 at least partially overlap with each other.

With the increase of bending times, the characteristics of transistors in the bent region of the flexible display panel 11 may change. Such change may cause the potential of a key node in the pixel circuit of the flexible display panel 11 to shift, leading to the problem, for example, a bright spot or not being dark in the dark state, in the bent region. It affects the display effect of the bent region.

In this embodiment, the arrangement in which the first bendable portion 14 and the second bendable portion 15 at least partially overlap with each other reduces the total area of the required bent region of the display panel component 10 in the outwardly-bent state and the inwardly-bent state, thus reducing the area of the display region affected by bending.

With continued reference to FIGS. 1 to 4 and FIGS. 12 to 15, in the inwardly-bent state, the bend centerline of the first bendable portion 14 may be a first bend centerline 22. In the outwardly-bent state, the bend centerline of the second bendable portion 15 may be a second bend centerline 23. In the thickness direction of the display panel component 10, the first bend centerline 22 and the second bend centerline 23 overlap with each other.

It is to be noted that any bend centerline in the present application refers to a straight line located inside a bent portion, passing through the geometric center of the bent portion, and extending in the direction perpendicular to the direction of the bent portion pointing to a non-bent portion. In the unbent state, the bent portion is symmetrical about the bend centerline. This is not repeated in the embodiments hereinafter.

Exemplarily, as shown in FIGS. 1 to 4 and FIGS. 12 to 15, the bend centerline of the first bendable portion 14 is the first bend centerline 22. In the unbent state, the first bendable portion 14 is symmetrical about the first bend centerline 22. In the inwardly-bent state, both sides of the first bendable portion 14 facing away from the first bend centerline 22 have the same shortest straight-line distance from the first bend centerline 22. The bend centerline of the second bendable portion 15 is the second bend centerline 23. In the unbent state, the second bendable portion 15 is symmetrical about the second bend centerline 23. In the outwardly-bent state, both sides of the second bendable portion 15 facing away from the second bend centerline 23 have the same shortest straight-line distance from the second bend centerline 23.

In this embodiment, in the thickness direction of the display panel component 10, the first bend centerline 22 and the second bend centerline 23 are arranged to overlap and the first bendable portion 14 and the second bendable portion 15 are each symmetrical about the first bend centerline 22 (the second bend centerline 23) in the unbent state, being conducive to reducing the difficulty of designing the bent structure 17 that drives the first bendable portion 14 and the second bendable portion 15 to deform, and thus facilitating implementation.

Figure 16:
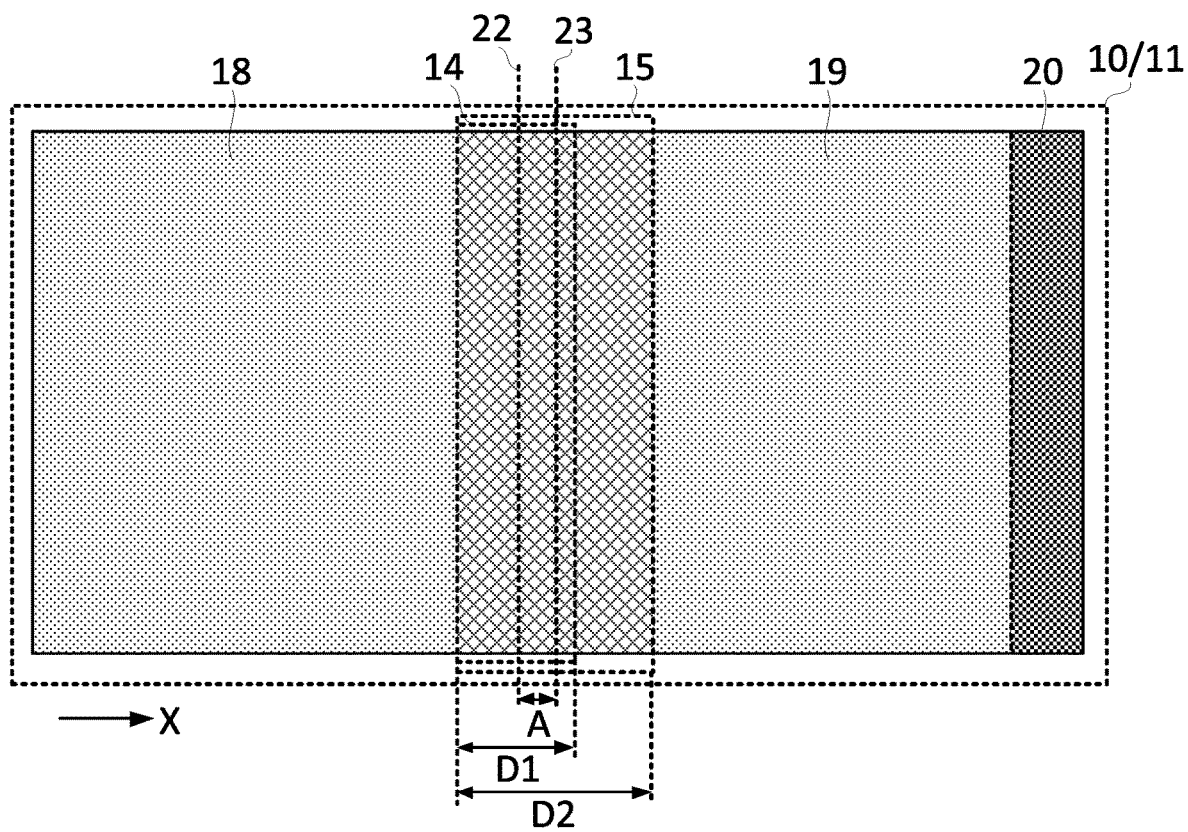
FIG. 16 is a top view illustrating the structure of another bendable display module in the unbent state according to embodiments of the present disclosure.
Figure 17:
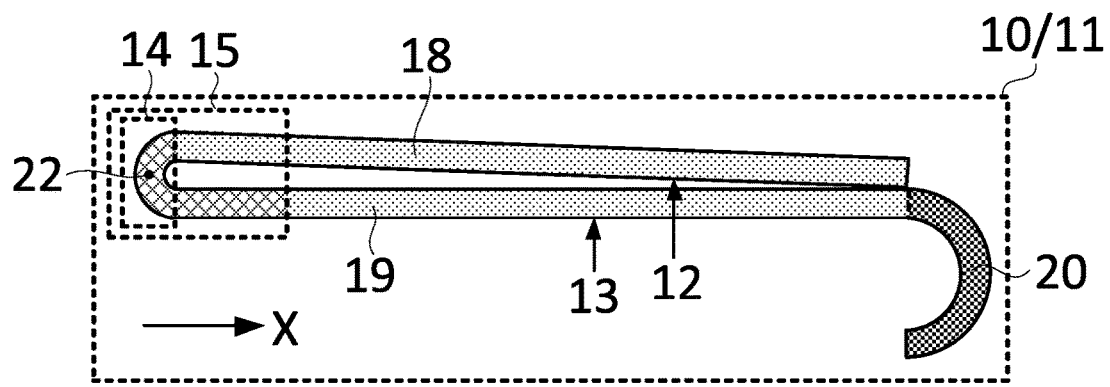
FIG. 17 is a side view illustrating the structure of another bendable display module in the inwardly-bent state according to embodiments of the present disclosure.
Figure 18:
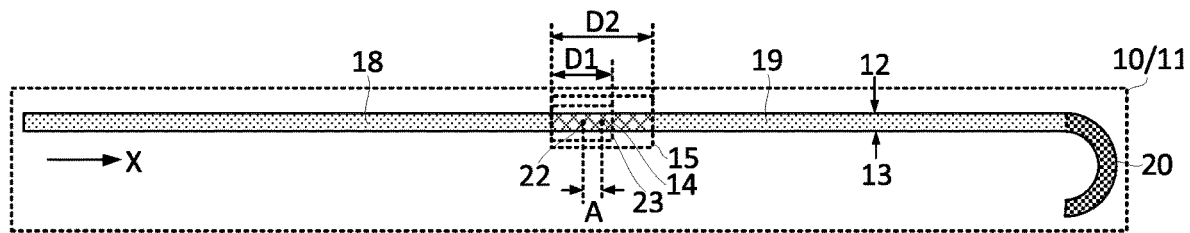
FIG. 18 is a side view illustrating the structure of another bendable display module in the unbent state according to embodiments of the present disclosure.
Figure 19:
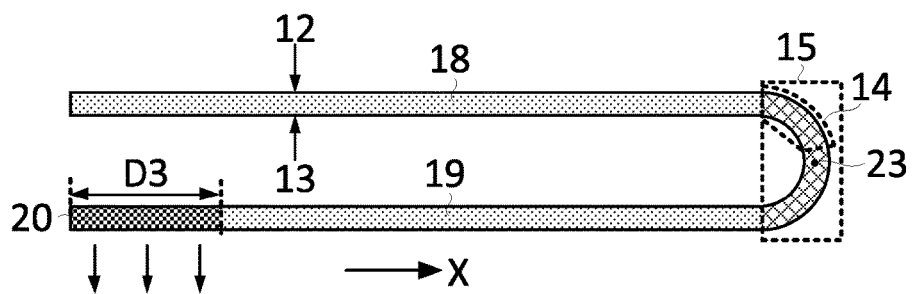
FIG. 19 is a side view illustrating the structure of another bendable display module in the outwardly-bent state according to embodiments of the present disclosure.

FIG. 16 is a top view illustrating the structure of another bendable display module in the unbent state according to embodiments of the present disclosure. FIG. 17 is a side view illustrating the structure of another bendable display module in the inwardly-bent state according to embodiments of the present disclosure. FIG. 18 is a side view illustrating the structure of another bendable display module in the unbent state according to embodiments of the present disclosure. FIG. 19 is a side view illustrating the structure of another bendable display module in the outwardly-bent state according to embodiments of the present disclosure. As shown in FIGS. 16 to 19, in the inwardly-bent state, the bend centerline of the first bendable portion 14 may be the first bend centerline 22. In the outwardly-bent state, the bend centerline of the second bendable portion 15 may be the second bend centerline 23. In the unbent state, in the direction parallel to the plane in which the first bendable portion 14 is located, the distance between the first bend centerline 22 and the second bend centerline 23 is A, where A>0.

In the inwardly-bent state, the maximum stress is applied to the first bendable portion 14 at the first bend centerline 22. In the outwardly-bent state, the maximum stress is applied to the second bendable portion 15 at the second bend centerline 23. In this embodiment, the distance A between the first bend centerline 22 and the second bend centerline 23 is arranged to be larger than 0 and the first bend centerline 22 and the second bend centerline 23 are located in different positions of the display panel component 10. Accordingly, the position where the maximum stress is applied to the display panel component 10 in the inwardly-bent state is different from the position where the maximum stress is applied to the display panel component 10 in the outwardly-bent state, being conducive to reducing the crease and preventing a fatigue break caused by the repeated inward and outward bending of the display panel component 10 at the same position.

With continued reference to FIG. 16 and FIG. 18, $A \leq \pi*(R2-R1)/2$.

Exemplarily, as shown in FIG. 16 and FIG. 18, an example in which $A \leq \pi*(R2-R1)/2$ is taken. In this case, in the unbent state, the projection of the second bendable portion 15 in the thickness direction of the display panel component 10 completely covers the projection of the first bendable portion 14 in the thickness direction of the display panel component 10. In one embodiment, a boundary of the first bendable portion 14 is parallel to the first bend centerline 22 and overlaps a boundary of the second bendable portion 15 which is parallel to the second bend centerline 23.

As shown in FIG. 16 and FIG. 18, in this embodiment, the arrangement in which $A \leq \pi*(R2-R1)/2$ ensures that the projection of the second bendable portion 15 in the thickness direction of the display panel component 10 completely covers the projection of the first bendable portion 14 in the thickness direction of the display panel component 10; In one embodiment, this arrangement ensures that the distance A between the first bend centerline 22 and the second bend centerline 23 is the longest. Accordingly, the area of the display region affected by bending is reduced and the distance between the first bend centerline 22 and the second bend centerline 23 is as long as possible, which is further conducive to reducing the crease and preventing a fatigue break caused by the repeated inward and outward bending of the display panel component 10 at the same position.

With continued reference to FIGS. 1, 3, 12, 14, 16 and 18, in the unbent state, the length of the first bendable portion 14 in a first direction X may be D1. The length of the second bendable portion 15 in the first direction X may be D2. $D1=\pi*R1$. $D2=\pi*R2$. The first direction is perpendicular to the extension direction of the first bend centerline 22. In one embodiment, the first direction X is parallel to the plane in which the first bendable portion 14 in the unbent state is located.

The bend radius of the first bendable portion 14 is R1. The length D1 of the first bendable portion 14 in the first direction X is arranged to be that $D1=\pi*R1$ and the first bendable portion 14 can be bent by 180° when bent inwardly, enhancing the portability of the bendable display module. Meanwhile, the area of the first bendable portion 14 is not excessively large, reducing the area of the display region affected by bending.

Further, the bend radius of the second bendable portion 15 is R2. The length D2 of the second bendable portion 14 in the first direction X is arranged to be that $D2=\pi*R2$ and the second bendable portion 15 can be bent by 180° when bent outwardly, enhancing the portability of the bendable display module. Meanwhile, the area of the second bendable portion 15 is not excessively large, reducing the area of the display region affected by bending.

Figure 20:
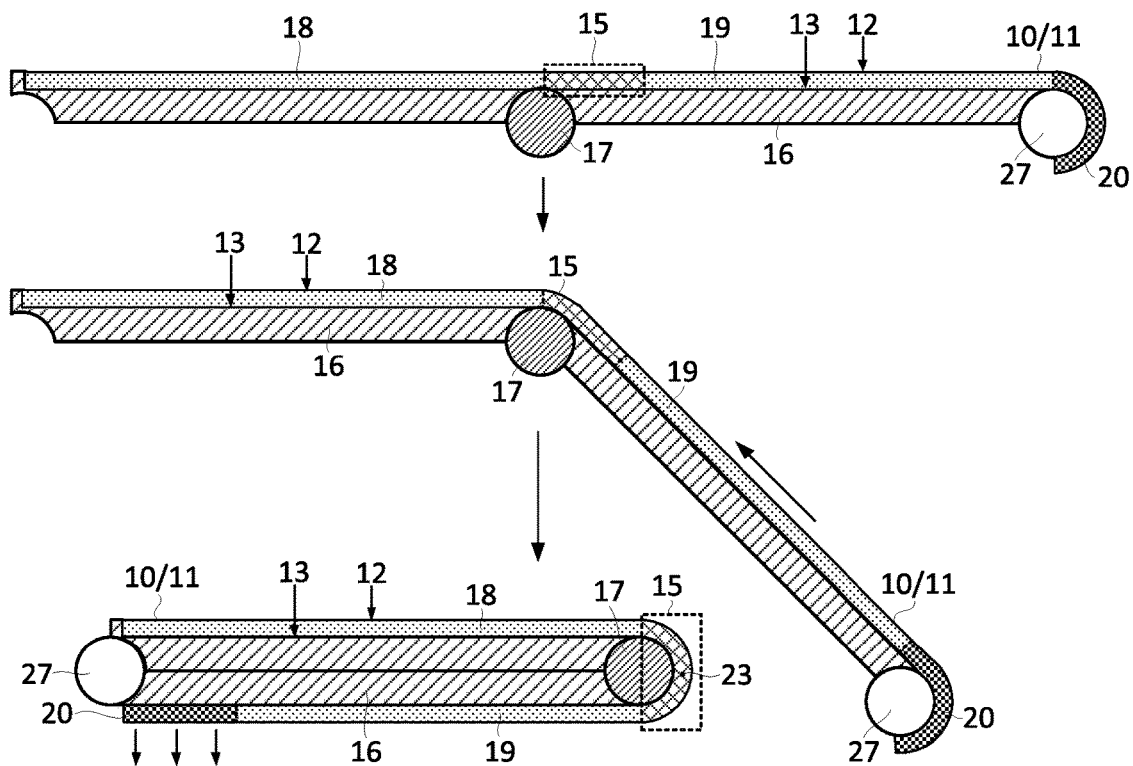
FIG. 20 is a diagram illustrating the structure of another bendable display module converted from the unbent state to the outwardly-bent state according to embodiments of the present disclosure.

FIG. 20 is a diagram illustrating the structure of another bendable display module converted from the unbent state to the outwardly-bent state according to embodiments of the present disclosure. As shown in FIGS. 5, 6 and 20, the bendable display module provided in embodiments of the present disclosure may further include a middle frame 16. The middle frame 16 is used for accommodating the display panel component 10. The first non-bent portion 18 is securely connected to the middle frame 16. The second non-bent portion 19 is slidably connected to the middle frame 16.

As shown in FIGS. 5, 6 and 20, the first non-bent portion 18 is securely connected to the middle frame 16. When the bendable display module is in the unbent state, the area of the display region of the flexible display panel 11 is equal to the area of the accommodation region provided by the middle frame 16. When the bendable display module is converted from the unbent state to the outwardly-bent state, the second bendable portion 15 is bent in the direction of the second surface 13 facing away from the first surface 12. An additional display region is needed at the bend for display. In this case, the light-emitting surface of the second bendable portion 15 of the flexible display panel 11 may serve as the display region at the bend. The second non-bent portion 19 is arranged to be slidably connected to the middle frame 16 and the second non-bent portion 19 on the middle frame 16 can slide in the direction toward the position where the second bendable portion 15 is located to cover the display region of the middle frame 16 that is originally covered by the second bendable portion 15, to prevent the flexible display panel 11 from being damaged due to the straining and stretching of the flexible display panel 11. When the bendable display module is converted from the outwardly-bent state to the unbent state, the second non-bent portion 19 on the middle frame 16 can slide in the direction away from the position where the second bendable portion 15 is located, making an accommodation space for the second bendable portion 15 at the bend portion, and to prevent the second bendable portion 15 from protruding and forming a fold.

Figure 21:
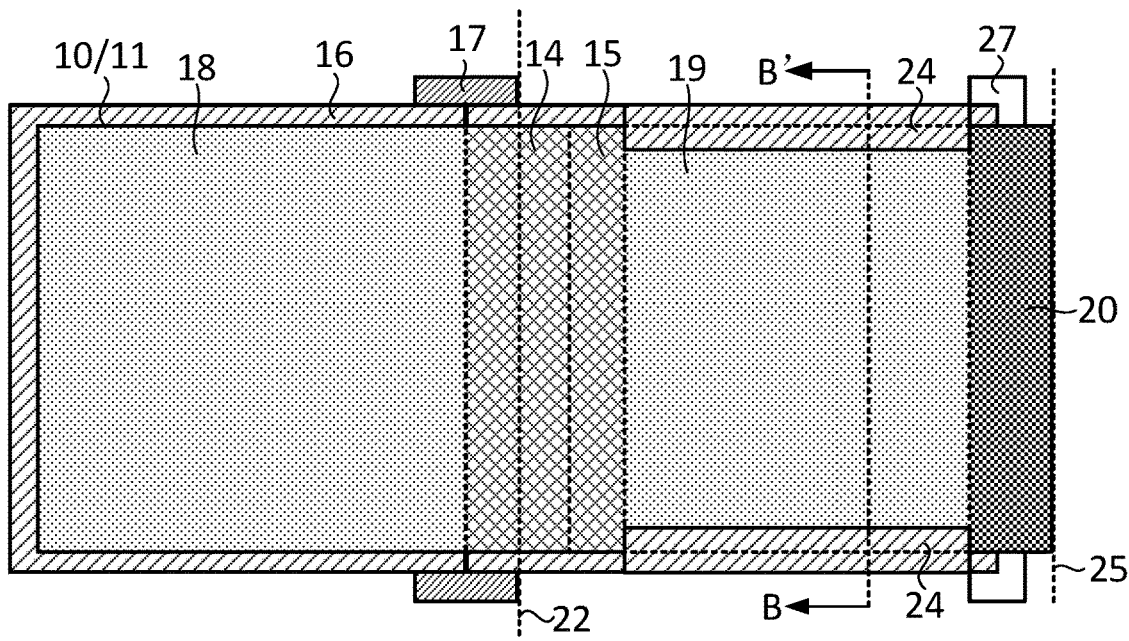
FIG. 21 is a top view illustrating the structure of another bendable display module in the unbent state according to embodiments of the present disclosure.
Figure 22:
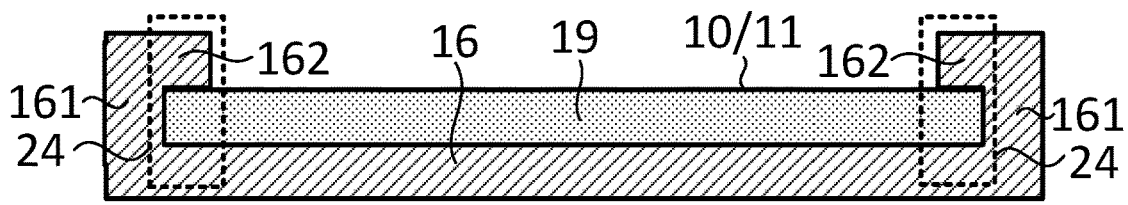
FIG. 22 is a section view taken along the direction B-B' of FIG. 21.

FIG. 21 is a top view illustrating the structure of another bendable display module in the unbent state according to embodiments of the present disclosure. FIG. 22 is a section view taken along the direction B-B' of FIG. 21. As shown in FIG. 21 and FIG. 22, the middle frame 16 may include a first guiding recess 24. The second non-bent portion 19 is slidably disposed in the first guiding recess 24 and the second non-bent portion 19 moves in the extension direction of the first guiding recess 24. The bend centerline of the first compensation bendable portion 20 during bending may be a third bend centerline 25. The extension direction of the first guiding recess 24 is perpendicular to the extension direction of the third bend centerline 25. The extension direction of the first guiding recess 24 is parallel to the plane in which the first compensation bendable portion 20 in the unbent state is located.

As mentioned above, when the bendable display module is converted from the unbent state to the outwardly-bent state or from the outwardly-bent state to the unbent state, the second non-bent portion 19 is displaced on the middle frame 16. As shown in FIG. 21 and FIG. 22, in this embodiment, the first guiding recess 24 is arranged on the middle frame 16 and the second non-bent portion 19 is slidably disposed in the first guiding recess 24 and the second non-bent portion 19 moves in the extension direction of the first guiding recess 24, to prevent the second non-bent portion 19 from shifting and warping in the moving process, and guaranteeing the flatness of the second non-bent portion 19.

It is to be noted that, as shown in FIG. 22, the edge of the middle frame 16 may be provided with a sidewall 161 and a protrusion portion 162 connected to the sidewall 161. The protrusion portion 162 and the second non-bent portion 19 at least partially overlap each other and the first guiding recess 24 for accommodating part of the second non-bent portion 19 is formed on the middle frame 16. The second non-bent portion 19 is embedded in the first guiding recess 24 to guide the second non-bent portion 19 to move in the extension direction of the first guiding recess 24. In other embodiments, the first guiding recess 24 may also be formed on the middle frame 16 in other manners, which is not limited in embodiments of the present disclosure.

Figure 23:
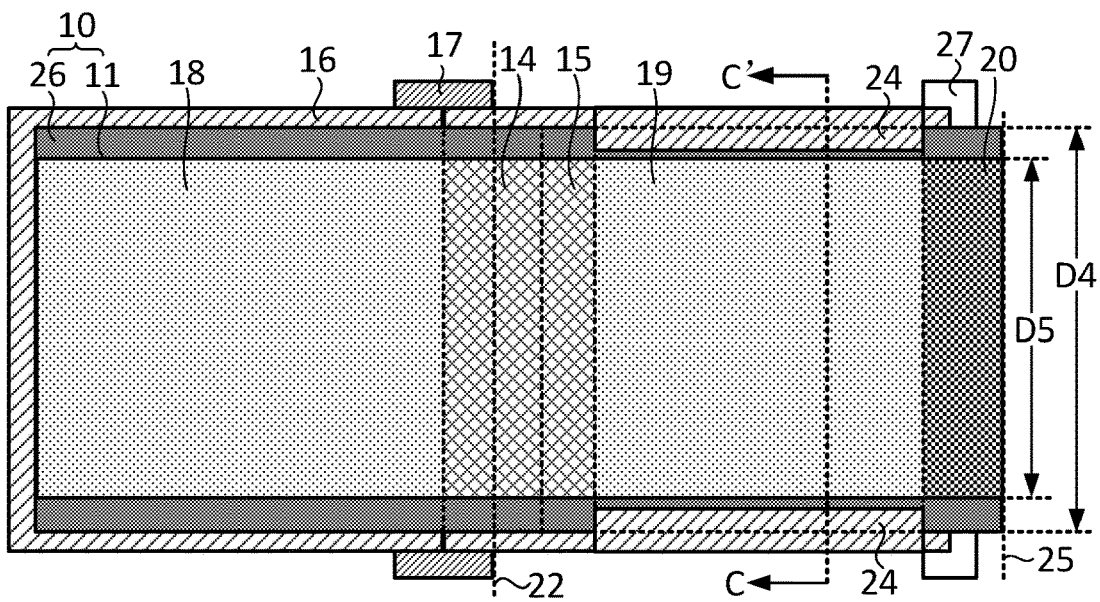
FIG. 23 is a top view illustrating the structure of another bendable display module in the unbent state according to embodiments of the present disclosure.
Figure 24:
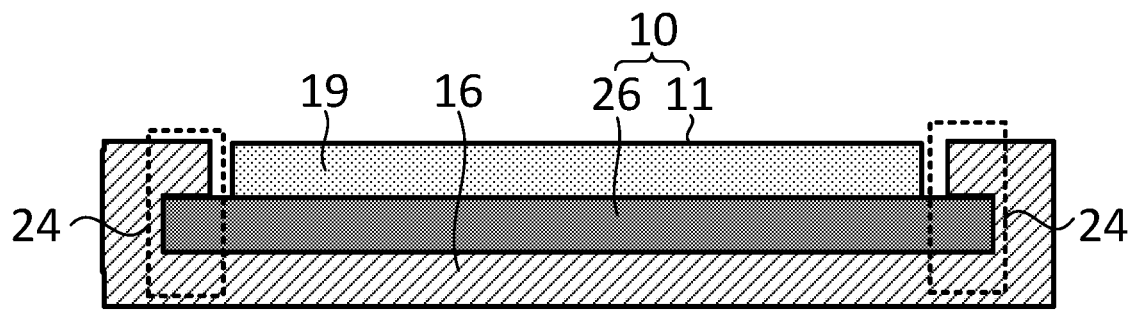
FIG. 24 is a section view taken along the direction C-C' of FIG. 23.

FIG. 23 is a top view illustrating the structure of another bendable display module in the unbent state according to embodiments of the present disclosure. FIG. 24 is a section view taken along the direction C-C' of FIG. 23. As shown in FIG. 23 and FIG. 24, the display panel component 10 may further include a support structure 26. The support structure 26 is located on a side of the flexible display panel 11 facing away from the light-emitting surface. The support structure 26 is securely connected to the flexible display panel 11. In the extension direction of the third bend centerline 25, the length of the support structure 26 is greater than the length of the flexible display panel 11. In one embodiment, the edge of the support structure 26 protrudes from the edge of the flexible display panel 11.

Exemplarily, as shown in FIG. 23 and FIG. 24, the support structure 26 is arranged on the side of the flexible display panel 11 facing away from the light-emitting surface and is securely connected to the flexible display panel 11 to support the flexible display panel 11.

As shown in FIG. 23, the length of the support structure 26 in the extension direction of the third bend centerline 25 is D4. The length of the flexible display panel 11 in the extension direction of the third bend centerline 25 is D5, where D4>D5, and the edge of the support structure 26 protrudes from the edge of the flexible display panel 11. In the extension direction of the third bend centerline 25, the length of the support structure 26 is arranged to be greater than the length of the flexible display panel 11 and the edge of the support structure 26 is arranged to protrude from the edge of the flexible display panel 11 and the edge of the flexible display panel 11 is protected, preventing the edge of the flexible display panel 11 from being bumped when the flexible display panel 11 is moved or transferred.

The support structure 26 may be a support layer whose material and thickness are arranged according to actual requirements. For example, the support structure 26 is a stainless steel layer fully bonded to the flexible display panel 11. This is not limited in embodiments of the present disclosure.

With continued reference to FIG. 23 and FIG. 24, the part of the support structure 26 protruding from the flexible display panel 11 may be slidably disposed in the first guiding recess 24.

Exemplarily, as shown in FIG. 23 and FIG. 24, the part of the support structure 26 protruding from the flexible display panel 11 is slidably disposed in the first guiding recess 24. When the bendable display module is converted from the unbent state to the outwardly-bent state or from the outwardly-bent state to the unbent state, the part of the support structure 26 protruding from the flexible display panel 11 may slide in the first guiding recess 24. Since the flexible display panel 11 and the support structure 26 are secured, the flexible display panel 11 moves along with the support structure 26 and the support structure 26 drives the flexible display panel 11 to be displaced on the middle frame 16, preventing the second non-bent portion 19 from shifting and warping in the moving process, guaranteeing the flatness of the second non-bent portion 19, meanwhile, preventing the first guiding recess 24 from scratching the edge of the flexible display panel 11, and helping increase the service life of the bendable display module.

With continued reference to FIGS. 7 to 9, FIG. 20, FIG. 21, and FIG. 23, the bendable display module provided in embodiments of the present disclosure may further include a sliding reel 27. The sliding reel 27 is connected to the middle frame 16. In the inwardly-bent state, the bend centerline of the first bendable portion 14 is the first bend centerline 22. The axial direction of the sliding reel 27 is parallel to the extension direction of the first bend centerline 22. In the unbent state and the inwardly-bent state, the first compensation bendable portion 20 is wound on the sliding reel 27.

Exemplarily, as shown in FIGS. 7 to 9, FIG. 20, FIG. 21, and FIG. 23, in this embodiment, the sliding reel 27 is arranged to be connected to the middle frame 16. The sliding reel 27 may be securely connected to the middle frame 16 or may be rotatably connected to the middle frame 16.

With continued reference to FIGS. 7 to 9, FIG. 20, FIG. 21, and FIG. 23, when the bendable display module is in the unbent state and the inwardly-bent state, the first compensation bendable portion 20 is wound on the sliding reel 27 to enable the first compensation bendable portion 20 to be bent in the direction of the second surface 13 facing away from the first surface 12, to reduce the space occupied by the first compensation bendable portion 20 in the direction perpendicular to the thickness direction of the flexible display panel 11.

When the sliding reel 27 may be securely connected to the middle frame 16, and the bendable display module is in the outwardly-bent state, the first compensation bendable portion 20 slides on the sliding reel 27 until sliding onto the middle frame 16 to be flattened, to compensate for the area of the display region required at the bend, filling the missing display region on the middle frame 16, enhancing the aesthetics of the bendable display module, and improving the display effect of the bendable display module.

When the sliding reel 27 may be rotatably connected to the middle frame 16, and the bendable display module is in the outwardly-bent state, the sliding reel 27 rotates to drive the first compensation bendable portion 20 to be displaced and then move onto the middle frame 16 to be flattened, to compensate for the area of the display region required at the bend, filling the missing display region on the middle frame 16, enhancing the aesthetics of the bendable display module, and improving the display effect of the bendable display module.

In this embodiment, the sliding reel 27 is arranged at the position of the first compensation bendable portion 20 and the first compensation bendable portion 20 is wound on the sliding reel 27 in the unbent state and the inwardly-bent state, implementing the first compensation bendable portion 20 to be bent in the direction of the second surface 13 facing away from the first surface 12. Accordingly, the first compensation bendable portion 20 is not suspended in the unbent state and the inwardly-bent state and it is unnecessary to arrange a support structure such as a hinge to support the first compensation bendable portion 20, simplifying structural design and facilitating implementation.

Figure 25:
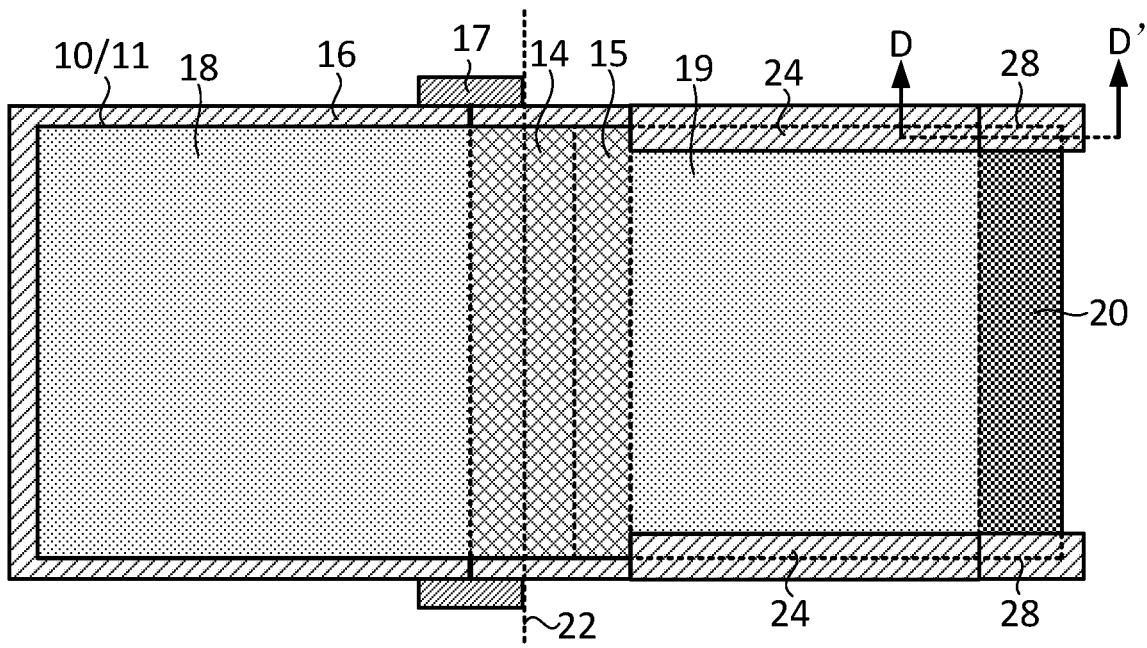
FIG. 25 is a top view illustrating the structure of another bendable display module in the unbent state according to embodiments of the present disclosure.
Figure 26:
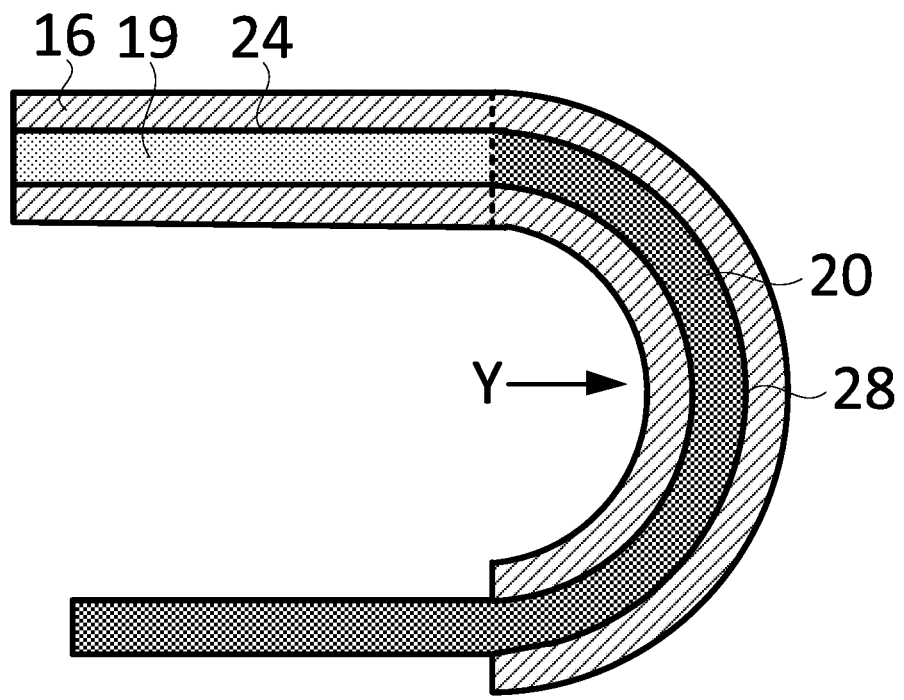
FIG. 26 is a sectional diagram taken along the direction D-D' of FIG. 25.
Figure 27:
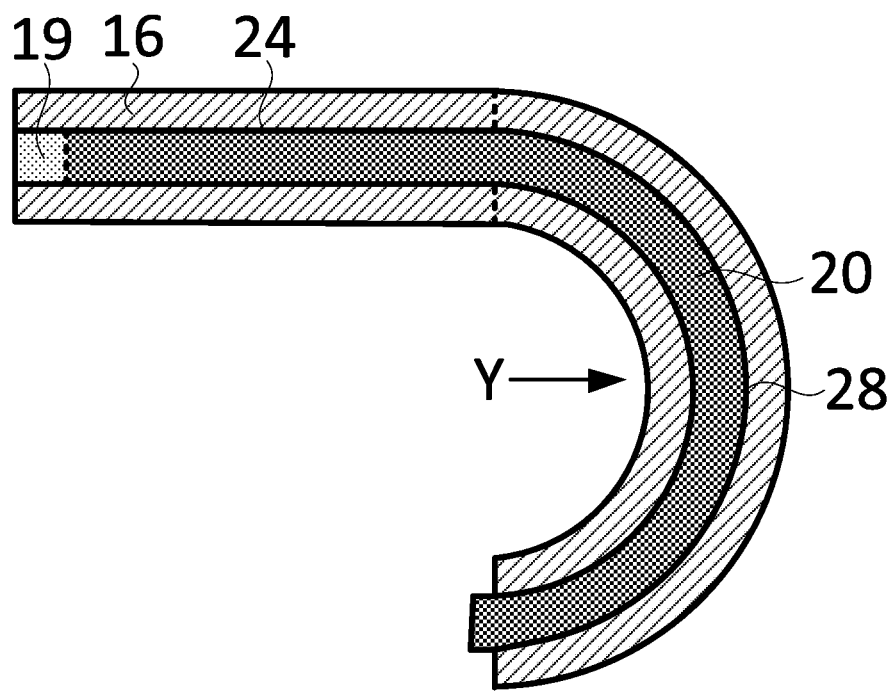
FIG. 27 is a partial section view illustrating the structure of a bendable display module in the outwardly-bent state according to embodiments of the present disclosure.

FIG. 25 is a top view illustrating the structure of another bendable display module in the unbent state according to embodiments of the present disclosure. FIG. 26 is a sectional diagram taken along the direction D-D' of FIG. 25. FIG. 27 is a partial section view illustrating the structure of a bendable display module in the outwardly-bent state according to embodiments of the present disclosure. As shown in FIGS. 25 to 27, the middle frame 16 may include an arc-shaped guiding recess. In the outwardly-bent state, the bend centerline of the first bendable portion 14 is the first bend centerline 22. In the direction parallel to the first bend centerline 22, the arc-shaped guiding recess 28 is located on both sides of the first compensation bendable portion 20. The protrusion direction Y of the arc-shaped guiding recess 28 faces away from the first bendable portion 14. The first compensation bendable portion 20 is slidably disposed in the arc-shaped guiding recess 28 and the first compensation bendable portion 20 moves in the extension direction of the arc-shaped guiding recess 28.

Exemplarily, as shown in FIGS. 25 to 27, in this embodiment, the middle frame 16 is provided with the arc-shaped guiding recess 28. In the direction parallel to the first bend centerline 22, the arc-shaped guiding recess 28 is located on both sides of the first compensation bendable portion 20 and the edges of both sides of the first compensation bendable portion 20 are placed in the arc-shaped guiding recess 28. The protrusion direction Y of the arc-shaped guiding recess 28 faces away from the first bendable portion 14 to enable the first compensation bendable portion 20 to be bent in the direction of the second surface 13 facing away from the first surface 12, to reduce the space occupied by the first compensation bendable portion 20 in the direction perpendicular to the thickness direction of the flexible display panel 11.

The first compensation bendable portion 20 is slidably disposed in the arc-shaped guiding recess 28. When the bendable display module is converted from the unbent state to the outwardly-bent state, the first compensation bendable portion 20 moves in the extension direction of the arc-shaped guiding recess 28 until sliding to the first guiding recess 24 to be flattened, to compensate for the area of the display region required at the outward bend, filling the missing display region on the middle frame 16, enhancing the aesthetics of the bendable display module, and improving the display effect of the bendable display module.

In this embodiment, the middle frame 16 is provided with the arc-shaped guiding recess 28 and in the unbent state and the inwardly-bent state, the first compensation bendable portion 20 can be bent in the direction of the second surface 13 facing away from the first surface 12. In one embodiment, the first compensation bendable portion 20 is not suspended in the unbent state and the inwardly-bent state and it is unnecessary to arrange a support structure such as a hinge to support the first compensation bendable portion 20, simplifying structural design and facilitating implementation.

Figure 28:
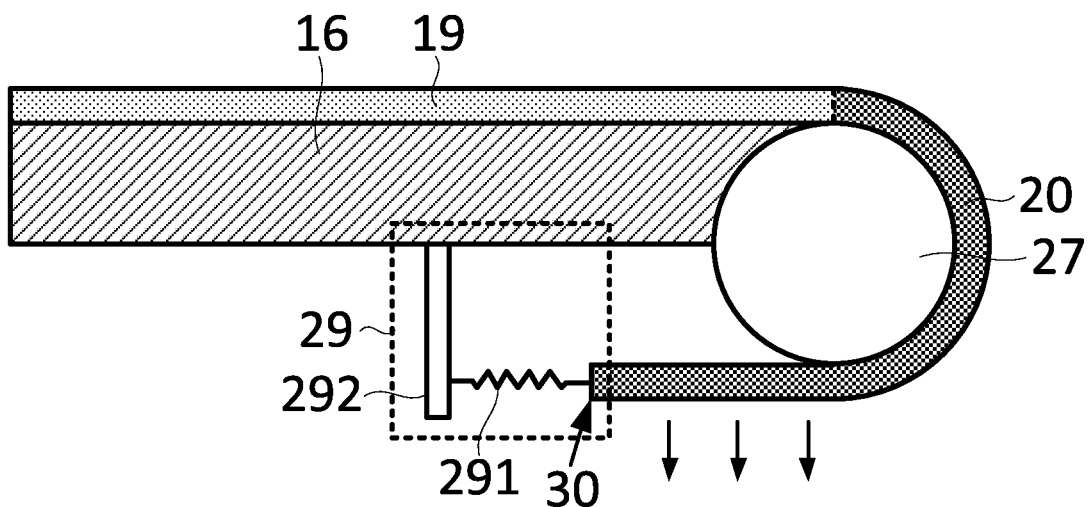
FIG. 28 is a partial section view illustrating the structure of a bendable display module in the unbent state and the inwardly-bent state according to embodiments of the present disclosure.
Figure 29:
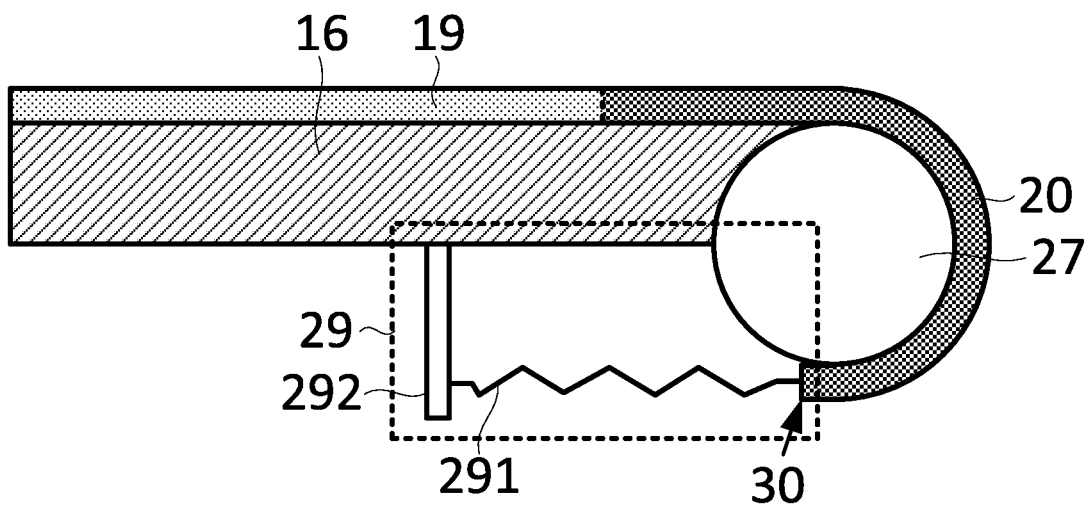
FIG. 29 is a partial section view illustrating the structure of another bendable display module in the outwardly-bent state according to embodiments of the present disclosure.

FIG. 28 is a partial section view illustrating the structure of a bendable display module in the unbent state and the inwardly-bent state according to embodiments of the present disclosure. FIG. 29 is a partial section view illustrating the structure of another bendable display module in the outwardly-bent state according to embodiments of the present disclosure. As shown in FIG. 28 and FIG. 29, the bendable display module provided in embodiments of the present disclosure may further include an elastic structure 29. The first compensation bendable portion 20 includes a free end 30. When the first compensation bendable portion 20 is unbent, the free end 30 is located on a side of the first compensation bendable portion 20 facing away from the second non-bent portion 19. The elastic structure 29 is connected to the middle frame 16 and the free end 30 separately.

Exemplarily, as shown in FIG. 28 and FIG. 29, the middle frame 16 and the free end 30 of the first compensation bendable portion 20 are connected through the elastic structure 29 and in the inwardly-bent state and the unbent state, the elastic force of the elastic structure 29 is used for providing tension for the first compensation bendable portion 20, to enable the first compensation bendable portion 20 to be bent in the direction of the second surface 13 facing away from the first surface 12. Accordingly, when the bendable display module is converted from the unbent state to the outwardly-bent state, the first compensation bendable portion 20 is prevented from warping, being conducive to reducing the crease and further flattening the surface of the flexible display panel 11.

The arrangement manner of the elastic structure 29 may be adopted according to actual requirements. For example, as shown in FIG. 28 and FIG. 29, the elastic structure 29 includes an elastic element 291 and a fixed structure 292. The elastic element 291 is connected to the middle frame 16 through the fixed structure 292. However, it is not limited thereto. In other embodiments, the elastic structure 29 may only include an elastic element 291 directly connected to the middle frame 16.

Further, the elastic element 291 is used for providing elastic force and may be manufactured by using any elastic material. For example, the elastic element 291 is made of a string or an elastic rope. This is not limited in embodiments of the present disclosure.

It is to be noted that the position for fixing the elastic structure 29 to the middle frame 16 may be arranged according to actual requirements. Exemplarily, as shown in FIG. 28 and FIG. 29, the position for fixing the elastic structure 29 to the middle frame 16 is arranged below the second non-bent portion 19. That is, in the thickness direction of the second non-bent portion 19, the projection of the second non-bent portion 19 covers the projection of the position for fixing the elastic structure 29 to the middle frame 16.

Figure 30:
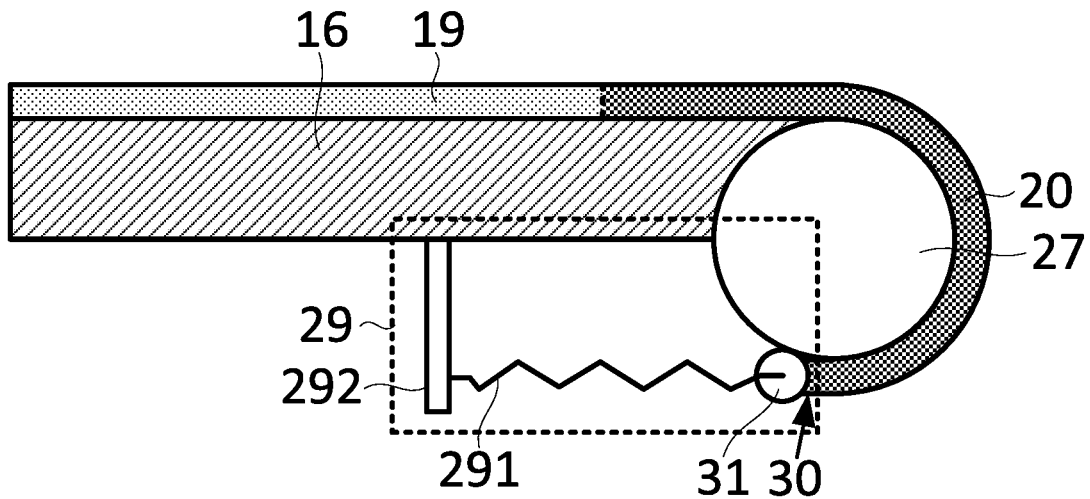
FIG. 30 is a partial section view illustrating the structure of another bendable display module in the outwardly-bent state according to embodiments of the present disclosure.
Figure 31:
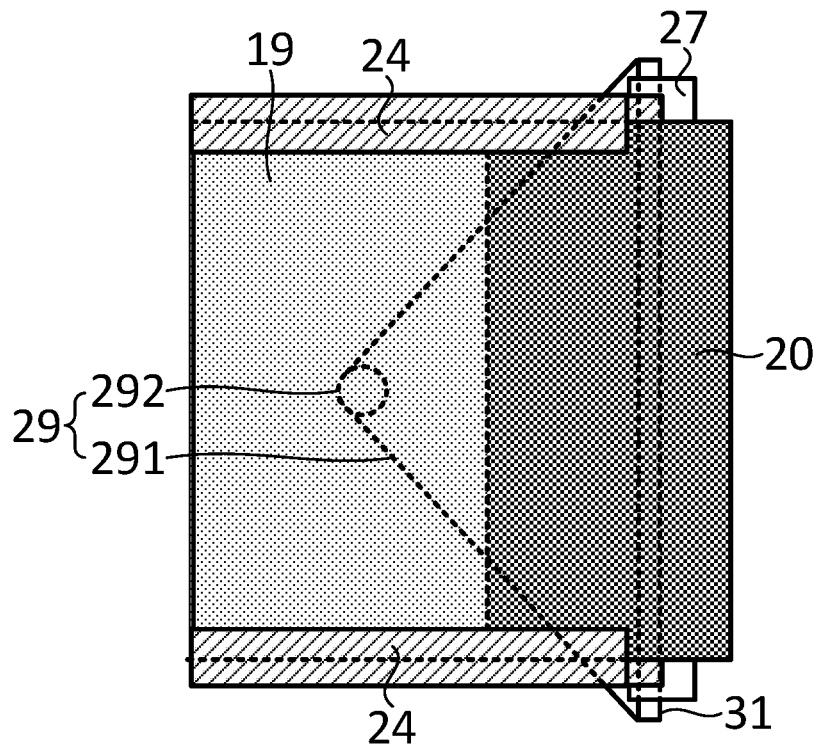
FIG. 31 is a partial top view illustrating the structure of another bendable display module in the outwardly-bent state according to embodiments of the present disclosure.

FIG. 30 is a partial section view illustrating the structure of another bendable display module in the outwardly-bent state according to embodiments of the present disclosure. FIG. 31 is a partial top view illustrating the structure of another bendable display module in the outwardly-bent state according to embodiments of the present disclosure. As shown in FIG. 30 and FIG. 31, the bendable display module provided in embodiments of the present disclosure may further include a moving shaft 31. The free end 30 of the first compensation bendable portion 20 is connected to the moving shaft 31. The elastic structure 29 is connected to both ends of the moving shaft 31.

As shown in FIG. 30 and FIG. 31, the free end 30 of the first compensation bendable portion 20 is connected to the moving shaft 31 and both ends of the moving shaft 31 are connected to the middle frame 16 through the elastic structure 29, helping make the force on both ends of the moving shaft 31 even, thus preventing a fold from being generated on the flexible display panel 11, and guaranteeing the flatness of the flexible display panel 11.

Figure 32:
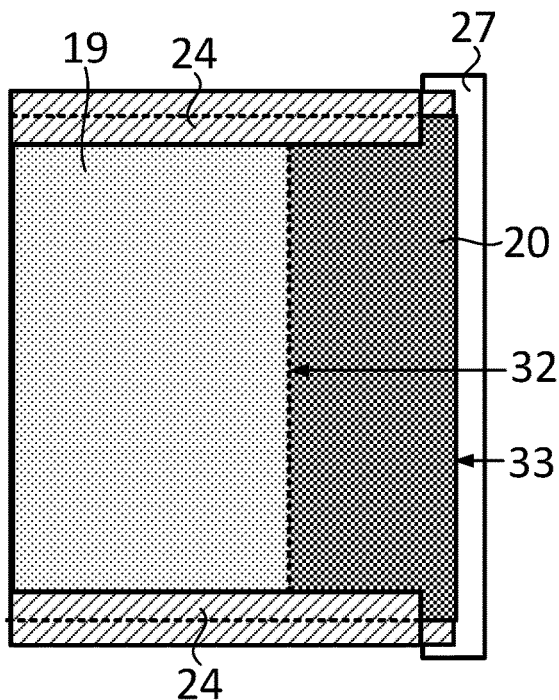
FIG. 32 is a partial view illustrating the structure of a bendable display module in the outwardly-bent state according to embodiments of the present disclosure.

FIG. 32 is a partial view illustrating the structure of a bendable display module in the outwardly-bent state according to embodiments of the present disclosure. As shown in FIG. 32, the edge of the second non-bent portion 19 close to the first compensation bendable portion 20 may be a first edge 32. When the first compensation bendable portion 20 is flattened, the edge of the first compensation bendable portion 20 facing away from the second non-bent portion 19 is a second edge 33. The second edge 33 is parallel to the first edge 32.

As shown in FIG. 32, the second edge 33 is arranged to be parallel to the first edge 32 and the display region of the flexible display panel 11 in the outwardly-bent state is well-shaped, to enhance the aesthetics of the bendable display module and improve the display effect of the bendable display module.

In one embodiment, the second edge 33 is arranged to be parallel to the first edge 32 and the elastic structure 29 can provide even tension for the free end 30 of the first compensation bendable portion 20, to help reduce the possibility that a fold is generated on the flexible display panel 11 and guaranteeing the flatness of the flexible display panel 11.

It is to be noted that the second edge 33 is not limited to being parallel to the first edge 32. In other embodiments, the shape of the second edge 33 may also be set according to an actual desired display effect, which is not limited in embodiments of the present disclosure.

As shown in FIG. 4 and FIG. 19, when the first compensation bendable portion 20 is flattened, the length of the first compensation bendable portion 20 in the first direction X may be D3, and $D3=\pi*(R2-R1)$. In the inwardly-bent state, the bend centerline of the first bendable portion 14 is the first bend centerline 22. The first direction X is perpendicular to the extension direction of the first bend centerline 22. In one embodiment, the first direction X is parallel to the plane in which the first bendable portion 14 in the unbent state is located.

As shown in FIG. 2 and FIG. 17, when the bendable display module is in the inwardly-bent state, the first bendable portion 14 is bent in the direction of the first surface 12 facing away from the second surface 13. In this case, the bend radius of the first bendable portion 14 is R1, and the flexible display panel 11 with a length of $\pi*R1$ is required for display at the bend. As shown in FIG. 4 and FIG. 19, when the bendable display module is in the outwardly-bent state, the second bendable portion 15 is bent in the direction of the second surface 13 facing away from the first surface 12. In this case, the bend radius is R2, and the flexible display panel 11 with a length of $\pi*R2$ is required for display at the bend. Accordingly, the difference between the length of the flexible display panel 11 required at the bend by the bendable display module in the inwardly-bent state and the length of the flexible display panel 11 required at the bend by the bendable display module in the outwardly-bent state is $\pi*(R2-R1)$.

In this embodiment, when the first compensation bendable portion 20 is flattened, the length D3 of the first compensation bendable portion 20 in the first direction X is arranged to be that $D3=\pi*(R2-R1)$ and when the bendable display module is in the outwardly-bent state, the length of the first compensation bendable portion 20 exactly compensates for the difference between the length of the flexible display panel 11 required at the bend by the bendable display module in the inwardly-bent state and the length of the flexible display panel 11 required at the bend by the bendable display module in the outwardly-bent state. Accordingly, in the inwardly-bent state and the unbent state, the first compensation bendable portion 20 may not occupy too much space; In one embodiment, the cost of the bendable display module may be reduced.

Figure 33:
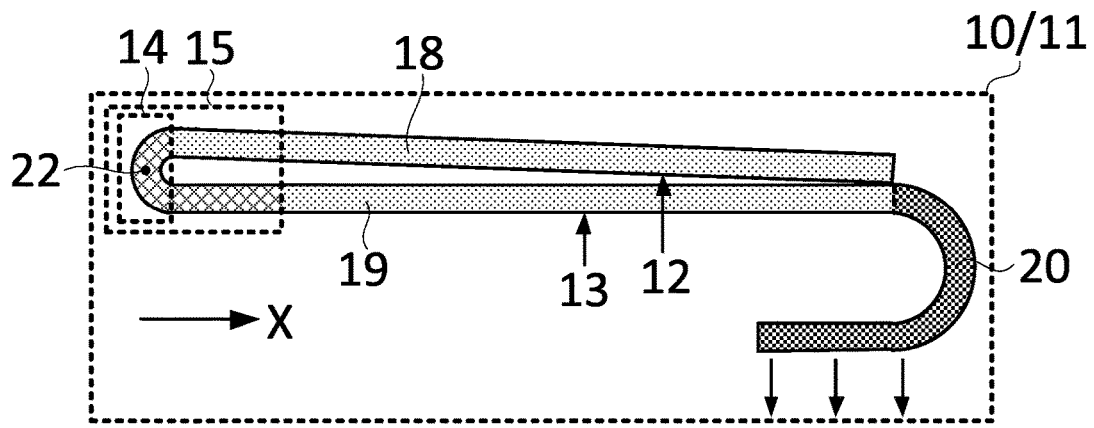
FIG. 33 is a side view illustrating the structure of another bendable display module in the inwardly-bent state according to embodiments of the present disclosure.
Figure 34:
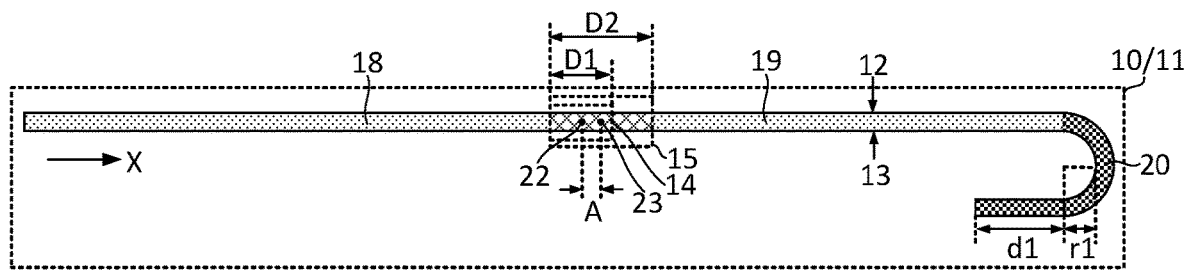
FIG. 34 is a side view illustrating the structure of another bendable display module in the unbent state according to embodiments of the present disclosure.
Figure 35:
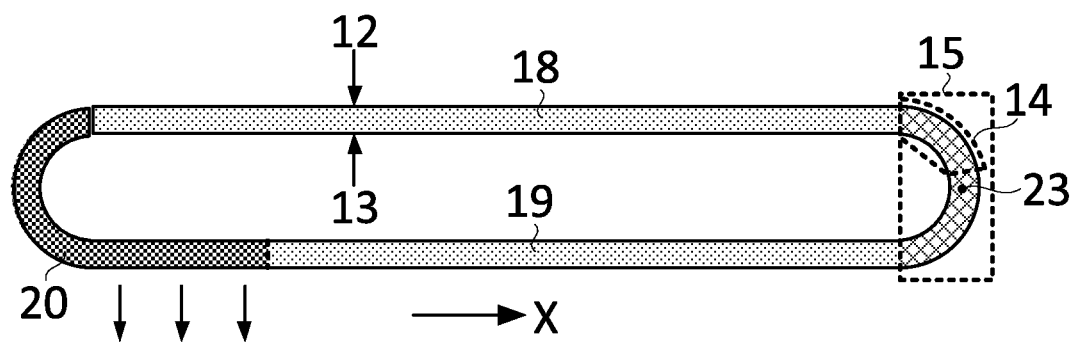
FIG. 35 is a side view illustrating the structure of another bendable display module in the outwardly-bent state according to embodiments of the present disclosure.

FIG. 33 is a side view illustrating the structure of another bendable display module in the inwardly-bent state according to embodiments of the present disclosure. FIG. 34 is a side view illustrating the structure of another bendable display module in the unbent state according to embodiments of the present disclosure. FIG. 35 is a side view illustrating the structure of another bendable display module in the outwardly-bent state according to embodiments of the present disclosure. As shown in FIGS. 28 to 29 and FIGS. 33 to 35, when the first compensation bendable portion 20 is flattened, the length of the first compensation bendable portion 20 in the first direction X may be D3, and D3>π*(R2−R1). In the inwardly-bent state, the bend centerline of the first bendable portion 14 is the first bend centerline 22. The first direction X is perpendicular to the extension direction of the first bend centerline 22. In one embodiment, the first direction X is parallel to the plane in which the first bendable portion 14 in the unbent state is located.

As shown in FIGS. 28 to 29 and FIGS. 33 to 35, in this embodiment, when the first compensation bendable portion 20 is flattened, the length D3 of the first compensation bendable portion 20 in the first direction X is arranged to be D3>π*(R2−R1) and when the bendable display module is in the inwardly-bent state, the first compensation bendable portion 20 may extend to the side of the second non-bent portion 19 facing away from the light-emitting surface of the second non-bent portion 19. Accordingly, in the inwardly-bent state, the first compensation bendable portion 20 may display more information and a larger image and the user can watch a relatively large display screen without unbending the bendable display module, enhancing user experience.

It is to be noted that as shown in FIGS. 28 to 29 and FIGS. 33 to 35, when the first compensation bendable portion 20 is flattened, the length D3 of the first compensation bendable portion 20 in the first direction X refers to the sum of the length of the flattened part of the first compensation bendable portion 20 in the first direction X in the figures and the length of the bent part of the first compensation bendable portion 20.

Exemplarily, as shown in FIG. 34, it is assumed that the length of the flattened portion of the first compensation bendable portion 20 in the first direction X is d1. The bend radius of the bent part of the first compensation bendable portion 20 is r1. Then when the first compensation bendable portion 20 is flattened, the length D3 of the first compensation bendable portion 20 in the first direction X is equal to d1+(π*r1).

With continued reference to FIGS. 28 to 29 and FIGS. 33 to 35, when the first compensation bendable portion 20 is flattened and the length D3 of the first compensation bendable portion 20 in the first direction X is greater than π*(R2−R1), in the inwardly-bent state and the unbent state, only part of the first compensation bendable portion 20 may be arranged to be bent in the direction of the second surface 13 facing away from the first surface 12. Part of the first compensation bendable portion 20 is flattened on a side of the second non-bent portion 19 facing away from the light-emitting surface of the second non-bent portion 19. In one embodiment, the light-emitting surface of the first compensation bendable portion 20 is located on a side of the first compensation bendable portion 20 facing away from the second non-bent portion 19 to improve the display effect. In the outwardly-bent state, only part of the first compensation bendable portion 20 is flattened to compensate for the display region required at the bend. Part of the first compensation bendable portion 20 is bent in the direction of the second surface 13 facing away from the first surface 12, enabling information to be displayed on a side and enhancing user experience.

Figure 36:
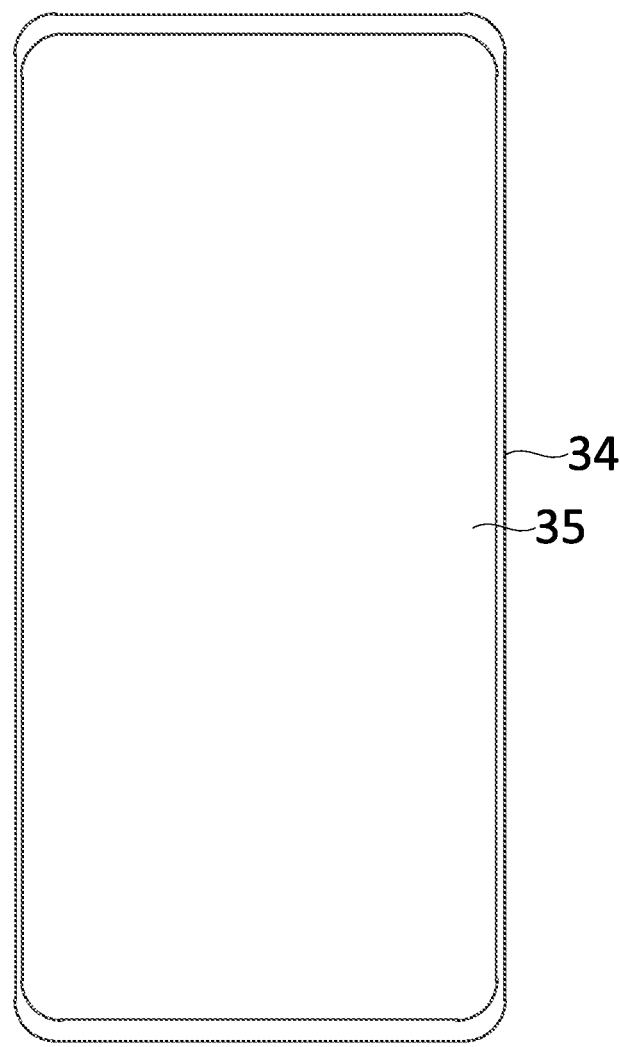
FIG. 36 is a view illustrating the structure of a display device according to embodiments of the present disclosure.

Based on the same concept, embodiments of the present disclosure also provide a display device. FIG. 36 is a view illustrating the structure of a display device according to embodiments of the present disclosure. As shown in FIG. 36, the display device 34 includes the bendable display module 35 described in any embodiment of the present disclosure. Accordingly, the display device 34 provided in embodiments of the present disclosure in the preceding embodiments. The explanations of the structures and terms that are the same as or corresponding to those in the preceding embodiments are not repeated here.

The display device 34 provided in embodiments of the present disclosure may be the phone shown in FIG. 36, or may be any electronic product with a display function, including but not limited to a television, a laptop, a desktop display, a tablet computer, a digital camera, a smart bracelet, a smart glass, a vehicle-mounted display, medical equipment, industrial control equipment, and a touch interactive terminal.

What is claimed is:

1. A bendable display module, comprising:
   a display panel component,
   wherein the display panel component comprises a flexible display panel, a first surface, a second surface, a first bendable portion and a second bendable portion; wherein the first surface and the second surface are disposed opposite to each other, and the first surface is a light-emitting surface of the flexible display panel; and
   the bendable display module comprises an inwardly-bent state, an unbent state, and an outwardly-bent state;
   wherein in the unbent state, the first bendable portion and the second bendable portion are flattened;
   in the inwardly-bent state, the first bendable portion is bent in a direction of the first surface facing away from the second surface;
   in the outwardly-bent state, the second bendable portion is bent in a direction of the second surface facing away from the first surface; and
   an area of a display region of the flexible display panel in the outwardly-bent state is larger than an area of the display region of the flexible display panel in the unbent state;
   wherein the display panel component further comprises a first non-bent portion, a second non-bent portion, and a first compensation bendable portion;
   in the unbent state, the first bendable portion and the second bendable portion are located between the first non-bent portion and the second non-bent portion;
   the first compensation bendable portion is located on a side of the second non-bent portion facing away from the first bendable portion and the second bendable portion;
   in the unbent state and the inwardly-bent state, the first compensation bendable portion is bent in the direction of the second surface facing away from the first surface; and
   in the outwardly-bent state, the first compensation bendable portion is flattened.

2. The bendable display module according to claim 1, wherein the bendable display module further comprises a bent structure configured to drive the first bendable portion and the second bendable portion to deform, wherein the bent structure is located on a side of the second surface facing away from the first surface; and in the inwardly-bent state, a bend radius of the first bendable portion is R1; in the outwardly-bent state, a bend radius of the second bendable portion is R2; and R1<R2.

3. The bendable display module according to claim 1, wherein the display panel component further comprises a second compensation bendable portion; the second compensation bendable portion is located on a side of the first non-bent portion facing away from the first bendable portion and the second bendable portion;

in the unbent state and the inwardly-bent state, the second compensation bendable portion is bent in the direction of the second surface facing away from the first surface; and in the outwardly-bent state, the second compensation bendable portion is flattened.

4. The bendable display module according to claim 1, wherein in a thickness direction of the display panel component, the first bendable portion and the second bendable portion at least partially overlap.

5. The bendable display module according to claim 4, wherein in the inwardly-bent state, a bend centerline of the first bendable portion is a first bend centerline;

in the outwardly-bent state, a bend centerline of the second bendable portion is a second bend centerline; and in the thickness direction of the display panel component, the first bend centerline and the second bend centerline overlap.

6. The bendable display module according to claim 4, wherein in the inwardly-bent state, a bend centerline of the first bendable portion is a first bend centerline;

in the outwardly-bent state, a bend centerline of the second bendable portion is a second bend centerline; and in the unbent state, along a direction parallel to a plane in which the first bendable portion is located, a distance between the first bend centerline and the second bend centerline is A, wherein A>0.

7. The bendable display module according to claim 6, wherein A≤π*(R2−R1)/2.

8. The bendable display module according to claim 5, wherein in the unbent state, a length of the first bendable portion in a first direction is D1, and a length of the second bendable portion in the first direction is D2, wherein D1=π*R1, D2=π*R2, the first direction is perpendicular to an extension direction of the first bend centerline, and the first direction is parallel to a plane in which the first bendable portion in the unbent state is located.

9. The bendable display module according to claim 1, wherein the bendable display module further comprises a middle frame configured to accommodate the display panel component; and the first non-bent portion is securely connected to the middle frame, and the second non-bent portion is slidably connected to the middle frame.

10. The bendable display module according to claim 9, wherein the middle frame comprises a first guiding recess, and the second non-bent portion is slidably disposed in the first guiding recess to enable the second non-bent portion to move in an extension direction of the first guiding recess, wherein a bend centerline of the first compensation bendable portion during bending is a third bend centerline, the extension direction of the first guiding recess is perpendicular to an extension direction of the third bend centerline, and the extension direction of the first guiding recess is parallel to a plane in which the first compensation bendable portion in the unbent state is located.

11. The bendable display module according to claim 10, wherein the display panel component further comprises a support structure, wherein the support structure is located on a side of the flexible display panel facing away from the light-emitting surface, and the support structure is securely connected to the flexible display panel; and in the extension direction of the third bend centerline, a length of the support structure is greater than a length of the flexible display panel, and an edge of the support structure protrudes from an edge of the flexible display panel.

12. The bendable display module according to claim 11, wherein a part of the support structure protruding from the flexible display panel is slidably disposed in the first guiding recess.

13. The bendable display module according to claim 9, wherein the bendable display module further comprises a sliding reel, wherein the sliding reel is connected to the middle frame;

in the inwardly-bent state, a bend centerline of the first bendable portion is a first bend centerline, and an axial direction of the sliding reel is parallel to an extension direction of the first bend centerline; and in the unbent state and the inwardly-bent state, the first compensation bendable portion is wound on the sliding reel.

14. The bendable display module according to claim 9, wherein the middle frame comprises an arc-shaped guiding recess;

in the outwardly-bent state, a bend centerline of the first bendable portion is a first bend centerline; and in a direction parallel to the first bend centerline, the arc-shaped guiding recess is located on both sides of the first compensation bendable portion;

a protrusion direction of the arc-shaped guiding recess faces away from the first bendable portion; and the first compensation bendable portion is slidably disposed in the arc-shaped guiding recess to enable the first compensation bendable portion to move in an extension direction of the arc-shaped guiding recess.

15. The bendable display module according to claim 13, wherein the bendable display module further comprises an elastic structure;

the first compensation bendable portion comprises a free end; and when the first compensation bendable portion is unbent, the free end is located on a side of the first compensation bendable portion facing away from the second non-bent portion; and the elastic structure is connected to the middle frame and the free end separately.

16. The bendable display module according to claim 15, wherein the bendable display module further comprises a moving shaft, wherein the free end of the first compensation bendable portion is connected to the moving shaft; and the elastic structure is connected to both ends of the moving shaft.

17. The bendable display module according to claim 1, wherein an edge of the second non-bent portion close to the first compensation bendable portion is a first edge;

when the first compensation bendable portion is flattened, an edge of the first compensation bendable portion facing away from the second non-bent portion is a second edge; and the second edge is parallel to the first edge.

18. The bendable display module according to claim 17, wherein when the first compensation bendable portion is flattened, a length of the first compensation bendable portion in a first direction is D3, and D3≥π*(R2−R1), wherein in the inwardly-bent state, a bend centerline of the first bendable portion is a first bend centerline, the first direction is perpendicular to an extension direction of the first bend centerline, and the first direction is parallel to a plane in which the first bendable portion in the unbent state is located.

19. A display device, comprising:

a bendable display module;

wherein the bendable display module comprises a display panel component, the display panel component comprises a flexible display panel, a first surface, a second surface, a first bendable portion and a second bendable portion; wherein the first surface and the second surface are disposed opposite to each other, and the first surface is a light-emitting surface of the flexible display panel; and the bendable display module comprises an inwardly-bent state, an unbent state, and an outwardly-bent state;

wherein in the unbent state, the first bendable portion and the second bendable portion are flattened;

in the inwardly-bent state, the first bendable portion is bent in a direction of the first surface facing away from the second surface;

in the outwardly-bent state, the second bendable portion is bent in a direction of the second surface facing away from the first surface; and an area of a display region of the flexible display panel in the outwardly-bent state is larger than an area of the display region of the flexible display panel in the unbent state;

wherein the display panel component further comprises a first non-bent portion, a second non-bent portion, and a first compensation bendable portion;

in the unbent state, the first bendable portion and the second bendable portion are located between the first non-bent portion and the second non-bent portion;

the first compensation bendable portion is located on a side of the second non-bent portion facing away from the first bendable portion and the second bendable portion;

in the unbent state and the inwardly-bent state, the first compensation bendable portion is bent in the direction of the second surface facing away from the first surface; and in the outwardly-bent state, the first compensation bendable portion is flattened.

20. The display device according to claim 19, wherein the display panel component further comprises a second compensation bendable portion; the second compensation bendable portion is located on a side of the first non-bent portion facing away from the first bendable portion and the second bendable portion;

in the unbent state and the inwardly-bent state, the second compensation bendable portion is bent in the direction of the second surface facing away from the first surface; and in the outwardly-bent state, the second compensation bendable portion is flattened.

* * * * *